(12) United States Patent
Uekura et al.

(10) Patent No.: US 8,277,054 B2
(45) Date of Patent: Oct. 2, 2012

(54) REFLECTING MIRROR, LAMP UNIT, AND PROJECTION TYPE IMAGE DISPLAY DEVICE

(75) Inventors: Naoki Uekura, Osaka (JP); Toshiaki Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 12/596,819

(22) PCT Filed: Aug. 7, 2008

(86) PCT No.: PCT/JP2008/002144
§ 371 (c)(1),
(2), (4) Date: Oct. 20, 2009

(87) PCT Pub. No.: WO2009/022455
PCT Pub. Date: Feb. 19, 2009

(65) Prior Publication Data
US 2010/0066985 A1     Mar. 18, 2010

(30) Foreign Application Priority Data
Aug. 10, 2007  (JP) .................................. 2007-209665

(51) Int. Cl.
G03B 21/28  (2006.01)
F21V 7/00   (2006.01)
(52) U.S. Cl. ...................... 353/98; 362/296.01; 362/297
(58) Field of Classification Search .................... 353/97, 353/99, 98; 362/257, 261–263, 346, 341, 362/347, 507, 514, 519, 539, 217.03, 311.09
See application file for complete search history.

(56) References Cited

U.S. PATENT DOCUMENTS

| | | | |
|---|---|---|---|
| 2005/0128440 A1* | 6/2005 | Akiyama | 353/99 |
| 2006/0187662 A1* | 8/2006 | Nishida et al. | 362/299 |

FOREIGN PATENT DOCUMENTS

| | | |
|---|---|---|
| JP | 2004-265702 | 9/2004 |
| JP | 2006-30378  | 2/2006 |
| JP | 2006-120646 | 5/2006 |

* cited by examiner

Primary Examiner — Thanh Luu
Assistant Examiner — Danell L Owens

(57) ABSTRACT

The present invention provides for example a reflecting mirror that has a reflecting surface that is capable or preventing the rise of the temperature of the electrodes due the reflection light. The reflecting surface that reflects towards the electrodes the light rays emitted by the lamp has been corrected such that within an area surrounded by line segments connecting points P1(Z1, Y1), P2(Z2, Y2) and P3(Z3, Y3) and a Z axis, a part Sp corresponding to a distance between the electrodes is enlarged, wherein on a Z-Y rectangular coordinate system defined with a common axis as the Z-axis and an axis intersecting the Z-axis at a right angle at a center point (C) between the electrodes as a Y-axis, Z coordinates of the points P1(Z1, Y1), P2(Z2, Y2) and P3(Z3, Y3) respectively represent positions of intersection points with the Z-axis of reflection lights which have been emitted from $1^{st}$ to $3^{rd}$ points arranged in the common axis in number order and have been reflected at an identical reflection point on the reflecting mirror, and Y coordinates thereof respectively represent illuminances at the intersection points.

8 Claims, 17 Drawing Sheets

Point Pt : (Z, Y)=(Za, Ya)
Point P2 : (Z, Y)=(Zp, 0)
Point Q2 : (Z, Y)=(Zq, 0)
Point P2a : (Z, Y)=(Zpa, 0)
Point Q2a : (Z, Y)=(Zqa, 0)
Point R : (Z, Y)=(Za, 0)

Point Pt : (Z, Y) = (Za, Ya)
Point P2 : (Z, Y) = (Zp, 0)
Point Q2 : (Z, Y) = (Zq, 0)
Point P2a : (Z, Y) = (Zpa, 0)
Point Q2a : (Z, Y) = (Zqa, 0)
Point R : (Z, Y) = (Za, 0)

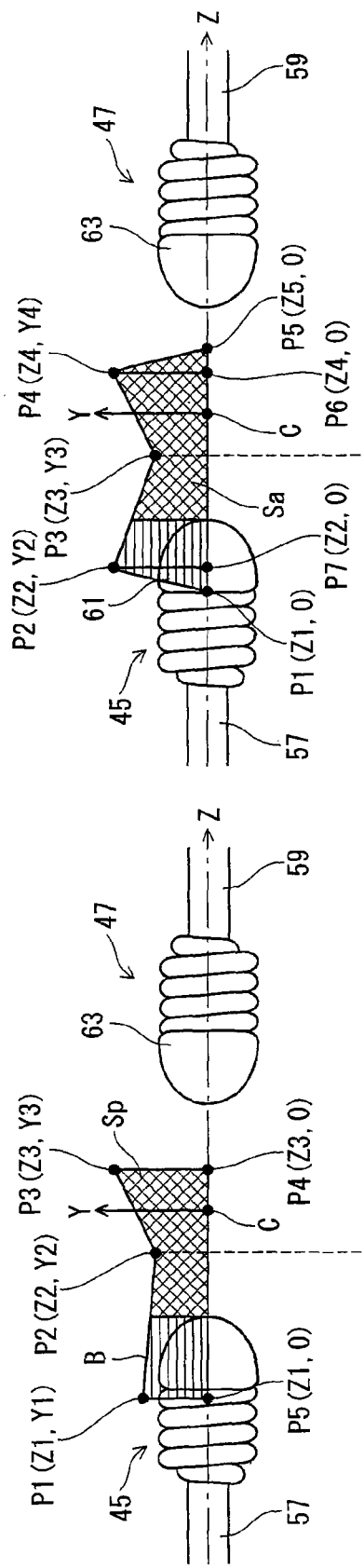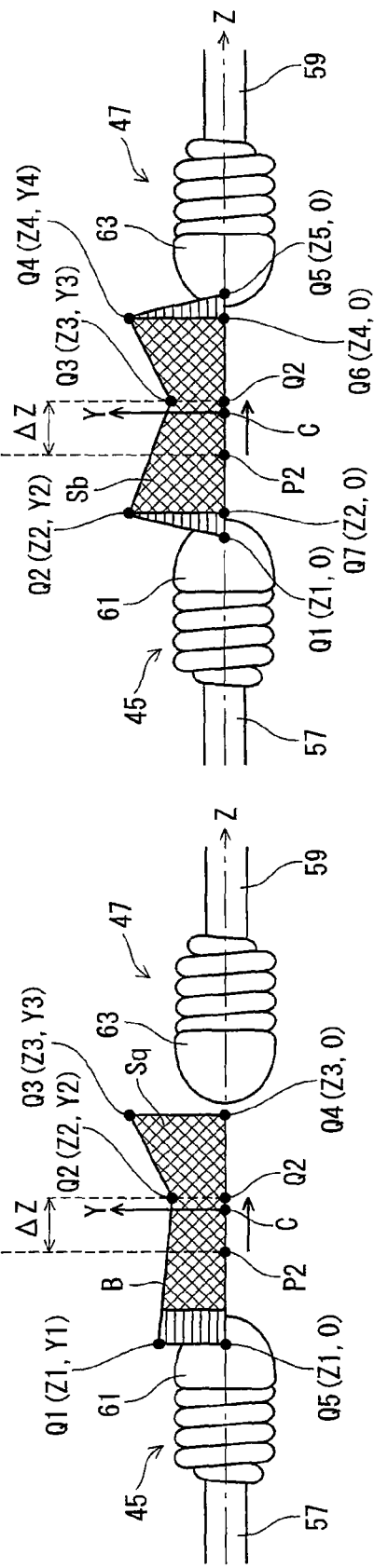
FIG. 10A
FIG. 10B

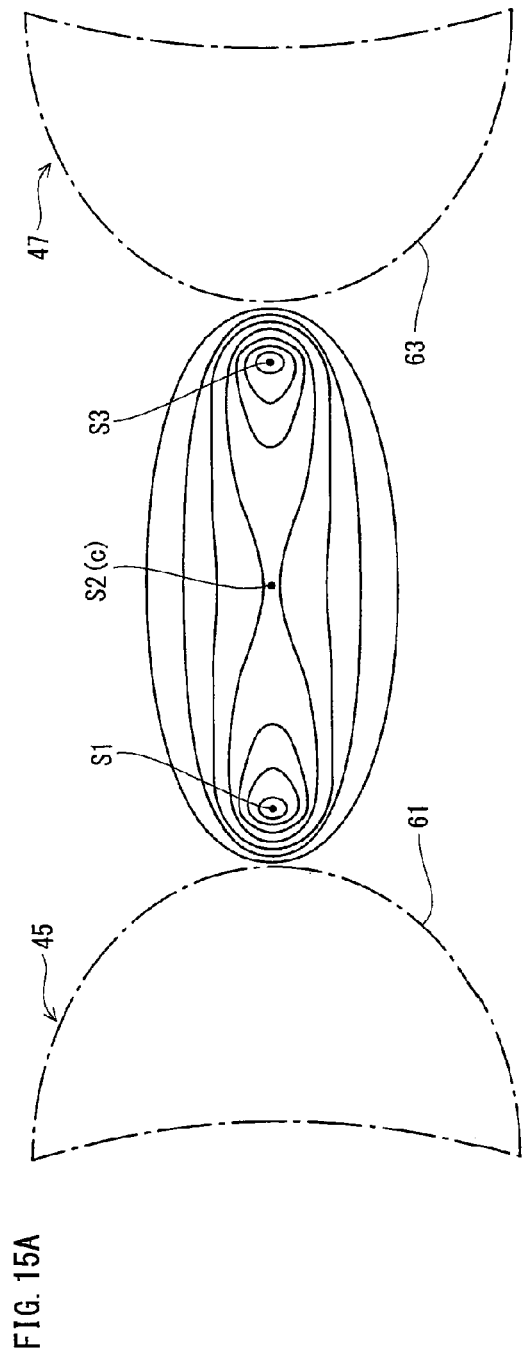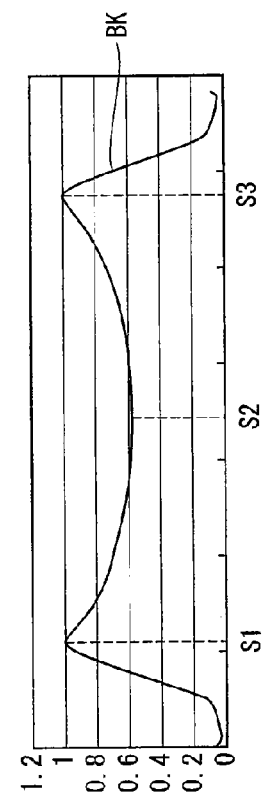
FIG. 15A
FIG. 15B

US 8,277,054 B2

REFLECTING MIRROR, LAMP UNIT, AND PROJECTION TYPE IMAGE DISPLAY DEVICE

TECHNICAL FIELD

The present invention relates to a reflecting mirror, a lamp unit that includes the reflecting mirror and a high-pressure discharge lamp, and a projection type image display apparatus that includes the lamp unit.

BACKGROUND ART

Basically, lamp units are composed of a reflecting mirror (hereinafter called "the main mirror" to distinguish it from an auxiliary reflecting mirror that will be described later) having a concave reflecting surface for reflecting light emitted from the high-pressure discharge lamp (hereinafter called "the lamp") to the object to be irradiated. In addition, some lamp units are composed of an auxiliary reflecting mirror for reflecting light from the lamp emitted in the opposite direction of the main reflecting mirror toward the light emission center (i.e. the center between a pair of electrodes).

The auxiliary reflecting mirror improves the efficiency for utilization of the light from the lamp emitted in the opposite direction of the main reflecting mirror. As a result, it improves the light collection efficiency.

Generally, the reflecting surface of the auxiliary reflecting mirror is spherical. The surface of the auxiliary reflecting mirror is attached to the lamp such that the light emission center of the lamp is at the spherical center. Ideally, this structure allows the light from the light emission center of the light to be reflected by the reflecting surface of the auxiliary reflecting mirror, and to travel toward the surface of the main reflecting mirror after passing through the light emission center of the light. In reality, however, refraction occurs when the light from the light emission center enters the bulb of the lamp, when the light goes out of the bulb, and so on. As a result, the light emitted from the lamp towards the auxiliary reflecting mirror and reflected by the auxiliary reflecting mirror may reach the electrodes without passing between the pair of the electrodes. Thus, it can hardly be said that the light from the lamp is used effectively.

Meanwhile, there is a technique to make a correction to the reflecting surface in view of the refraction (Patent Document 1). This technique is to make a correction to the reflecting surface of the main reflecting mirror such that the light from the light emission center of the lamp will be collected at the second focal point. It is possible to apply this technique to make a correction to the reflecting surface of the auxiliary reflecting mirror such that the light from the light emission center of the lamp will be reflected by the reflecting surface of the auxiliary reflecting mirror and returns to the light emission center.

Patent Document 1: Japanese Laid-open Patent Application Publication No. 2004-265702

DISCLOSURE OF THE INVENTION

Problems to be Solved by the Invention

However, the correction technique explained above is based on the assumption that the light is emitted from the light emission center of the lamp. When practically applying the technique above to a lamp with a certain luminance distribution between the pair of electrodes, the inventor of the present invention found that the temperature of the electrodes of the lamp sharply rose and the electrodes gravely depleted.

FIG. 15A, shows the luminance distribution of a lamp, and FIG. 15B shows the luminance distribution cut along the center line of the lamp. Note that FIG. 15B shows the distribution with relative luminance values where the highest luminance value is "1".

As FIG. 15B shows, the luminance is the highest in the vicinities of the electrodes. Between the electrodes, the luminance is lowest at the middle of the electrodes. The two highest luminance points mentioned here are called "point S1" and "point S3", and the lowest luminance point is called "point S2".

The following explains the paths of the light rays from the points S1, S2 and S3 to an arbitrary point Pt on the reflecting surface, and the paths of the light rays reflected at the point Pt.

FIG. 16 shows the paths (pre-reflection paths) of the light rays that are emitted from the points S1, S2 and S3 of FIG. 15B and reach the point Pt on the reflecting surface 901. FIG. 17 shows the paths (post-reflection paths) of the light rays reflected at the point Pt on the reflecting surface 901.

(1) Pre-Reflection Paths

The paths of the light rays from the points S1, S2 and S3 to the point Pt on the reflecting surface are not affected by whether the reflecting surface of the reflecting mirror (903) is corrected (i.e. the reflecting surface 903) or not corrected (i.e. the reflecting surface 901). That is, the light rays emitted from the points S1, S2 and S3 are respectively refracted when entering the bulb 907 of the lamp 905 and when going out of the bulb 907, and reach the point Pt on the reflecting surface 901.

(2) Post-Reflection Paths

As FIG. 17A shows, in the lamp unit whose reflecting surface 901 is not corrected, the light rays after the reflection are respectively refracted when entering the bulb 907 of the lamp 905 and when going out from the bulb 907 to the discharge space 909, and respectively travel in the different directions. The light rays (depicted as three lines) respectively swerve towards the opposite direction of the auxiliary reflecting mirror 903 with respect to the light emission center C. Among the three light rays in the drawing, the leftmost light ray reaches the electrode 911.

On the other hand, in the lamp unit whose reflecting surface 921 is corrected with the correction technique explained above, the reflecting surface 921 is corrected such that the light ray emitted from the light emission center C will be reflected by the reflecting surface 921 and return to the light emission center C in the discharge space 909. Thus, as FIG. 17B shows, the light ray emitted from the light emission center C (i.e. the point S3) is reflected at the point Pt on the reflecting surface 921, and returns to the light emission center C.

However, even in the case of the lamp unit with the corrected reflecting surface 921, the leftmost light ray among the three light rays reaches the tip of the electrode 911.

In this way, if the light rays emitted from the high luminance points S1 and S3 are reflected by the reflecting surface 901 or 921 and returns to the electrode 911, the temperature of the electrode 911 rises excessively. This leads to the evaporation of the electrode material and shortens the life of the lamp.

The present invention is made to solve this problem. In view of the luminance distribution of the actual arc generated in a practical lamp, the present invention aims to provide a reflecting mirror, a lamp unit and a projection type image display apparatus that are equipped with a reflecting surface that is capable of preventing the light, emitted from the high-luminance points and reflected by the reflecting surface, from excessively rising the temperature of the electrode.

Means for Solving the Problem

To achieve the object above, one aspect of the present invention provides a reflecting mirror that is for attaching to a high-pressure discharge lamp including a bulb and a pair of electrodes provided in the bulb, and has a reflecting surface that reflects toward the pair of electrodes some of light rays emitted by the high-pressure discharge lamp, the pair of electrodes opposing each other in a common axis thereof, wherein the reflecting surface has been corrected from a spherical surface at a given reflection point on the reflecting surface such that within an area surrounded by line segments connecting points P1(Z1,Y1) to Pn(Zn,Yn), Pp(Zn, 0), Pq(Z1, 0) and the point P1(Z1, Y1) in the stated order, a part corresponding to a distance between the pair of electrodes is enlarged, where (i) a Z-Y rectangular coordinate system is defined with the common axis as a Z-axis and an axis intersecting the Z-axis at a right angle as a Y-axis, (ii) a Z-coordinate of a point $Pi(Zi,Yi)$ ($1 \leq i \leq n$) on the Z-Y rectangular coordinate system represents a position of an intersection point with the Z-axis of an $i^{th}$ reflection light ray that has been emitted from an $i^{th}$ one of $1^{st}$ to $n^{th}$ points ($n \geq 3$) arranged in the common axis in number order and has been reflected at the reflection point, and a Y-coordinate of the point $Pi(Zi,Yi)$ represents an illuminance at the intersection point, and (iii) the point Pp (Zn,0) and the point Pq (Z1,0) respectively represent intersection points with the Z-axis of an $n^{th}$ reflection light ray and a $1^{st}$ reflection light ray.

Here, each of the "electrodes" may be anything that includes a part for generating an arc (i.e. each electrode may be in a coil shape, a rod shape, or a tube shape, for example). For example, each electrode may be an electrode coil, or may be consisted of an electrode coil and an electrode shaft.

In the recitation "reflects toward the pair of electrodes some of light rays emitted by the high-pressure discharge lamp", the wording "toward the pair of electrodes" is a concept including "toward the pair of electrodes", "toward an area between the pair of electrodes", and "toward the pair of electrodes and a point between the pair of electrodes".

It does not matter whether the point Pn and Pp are different points or identical points. In the same manner, it does not matter whether the point P1 and Pq are different points or identical points.

The reflecting surface reflects, toward the pair of electrodes, the light rays emitted by the high-pressure discharge lamp in the opposite direction of the object to be irradiated. However, the reflection light rays reach the electrodes in some cases, depending on the wall thickness of the bulb and the shape of the bulb (not often compared to the spherical reflecting surface). The reflecting mirror pertaining to the present invention has a reflecting surface that reflects, toward pair of electrodes, the light rays emitted by the high-pressure discharge lamp in the opposite direction of the object to be irradiated.

The term "high-pressure discharge lamp" includes a high-pressure mercury lamp, a metal halide lamp, and so on.

ADVANTAGEOUS EFFECTS OF THE INVENTION

As stated above, since the reflecting mirror pertaining to the present invention has been corrected with respect to the n light rays emitted from the n points between the pair of electrodes arranged in the common axis of the pair of electrodes, it is possible to take into consideration the luminance distribution of the actual arc that is actually generated between the pair of electrodes.

Also, the reflecting surface has been corrected at given reflection points such that within an area surrounded by line segments connecting points P1(Z1,Y1) to Pn(Zn,Yn), Pp(Zn, 0), Pq(Z1, 0) and the point P1(Z1, Y1) in the stated order, a part corresponding to a distance between the pair of electrodes is enlarged from that of the case where the light rays emitted from the n points are reflected by a spherical surface. This prevents the light rays reflected by the reflecting mirror from reaching the electrodes. As a result, it is possible to improve the light collection efficiency, and the light utilization efficiency of the apparatus. Further, it is possible to suppress the rise in temperatures of the electrodes due to the reflection light rays. This improves the life property of the high-pressure discharge lamp.

Further, it is possible to prevent light rays emitted from high-luminance points from being reflected by the reflecting surface and reaching the electrodes by determining two points among the $1^{st}$ point to the $n^{th}$ point to be the high-luminance points. As a result, it is possible to prevent excessive rise of the temperature of the electrodes.

The $1^{st}$ to $n^{th}$ points may include a center point between the pair of electrodes and a pair of points that are between the pair of electrodes and are on both sides of the center point, the pair of points showing luminance peaks. Alternatively, n may be 3, a $2^{nd}$ point arranged in the common axis may be the center point between the pair of electrodes, and a $1^{st}$ point and a $3^{rd}$ point arranged in the common axis may be the pair of points showing the luminance peaks With the stated structures, the luminance distribution to be used for the correction can be close to the luminance distribution of the actual arc that is actually generated. This realizes an accurate correction.

The reflecting surface may have been corrected at the given reflection point such that the part corresponding to the distance between the pair of electrodes is substantially maximized.

With the stated structure, the positions for substantially maximizing the part corresponding to the distance between the pair of electrodes can be calculated with use of a computer. This makes the correction easy.

Another aspect of the present invention provides a lamp unit comprising a high-pressure discharge lamp and the reflecting mirror stated above.

With the stated structure, it is possible to take into consideration the luminance distribution of the actual arc that is actually generated between the pair of electrodes. This prevents the light rays reflected by the reflecting mirror from reaching the electrodes. As a result, it is possible to improve the light collection efficiency, and the light utilization efficiency of the apparatus. Further, it is possible to suppress the rise in temperatures of the electrodes due to the reflection light rays. This improves the life property of the high-pressure discharge lamp. Further, it is possible to prevent light rays emitted from high-luminance points from being reflected by the reflecting surface and reaching the electrodes by determining two points among the $1^{st}$ point to the $n^{th}$ point to be the high-luminance points. As a result, it is possible to prevent excessive rise of the temperature of the electrodes.

The lamp unit stated above may further comprise a second reflecting mirror that reflects, in a predetermined direction, light rays emitted by the high-pressure discharge lamp not toward the reflecting mirror and light rays reflected by the reflecting mirror.

With the stated structure, the lamp unit can efficiently use the light rays emitted from the high-pressure discharge lamp in all directions.

Another aspect of the present invention provides a projection type image display apparatus comprising the lamp unit stated above as a light source.

With the stated structure, it is possible to take into consideration the luminance distribution of the actual lamp and prevent the light rays emitted from the high-luminance positions and reflected at the reflecting surface from excessively increasing the temperature of the electrodes.

BRIEF DESCRIPTION OF THE DRAWINGS

FIG. 4A shows the paths without correction and FIG. 4B shows the paths with correction;

FIG. 5A shows the illumination distribution before the correction, and FIG. 5B shows the illumination distribution after the correction;

FIG. 10A is a drawing for explaining a correction method pertaining to a modification example 1a, and FIG. 10B is a drawing for explaining a correction method pertaining to a modification example 1b;

FIG. 15A shows a luminance distribution of a lamp, and FIG. 15B shows the luminance distribution cut along the center line of the lamp;

EXPLANATION OF REFERENCES

Figure 1:
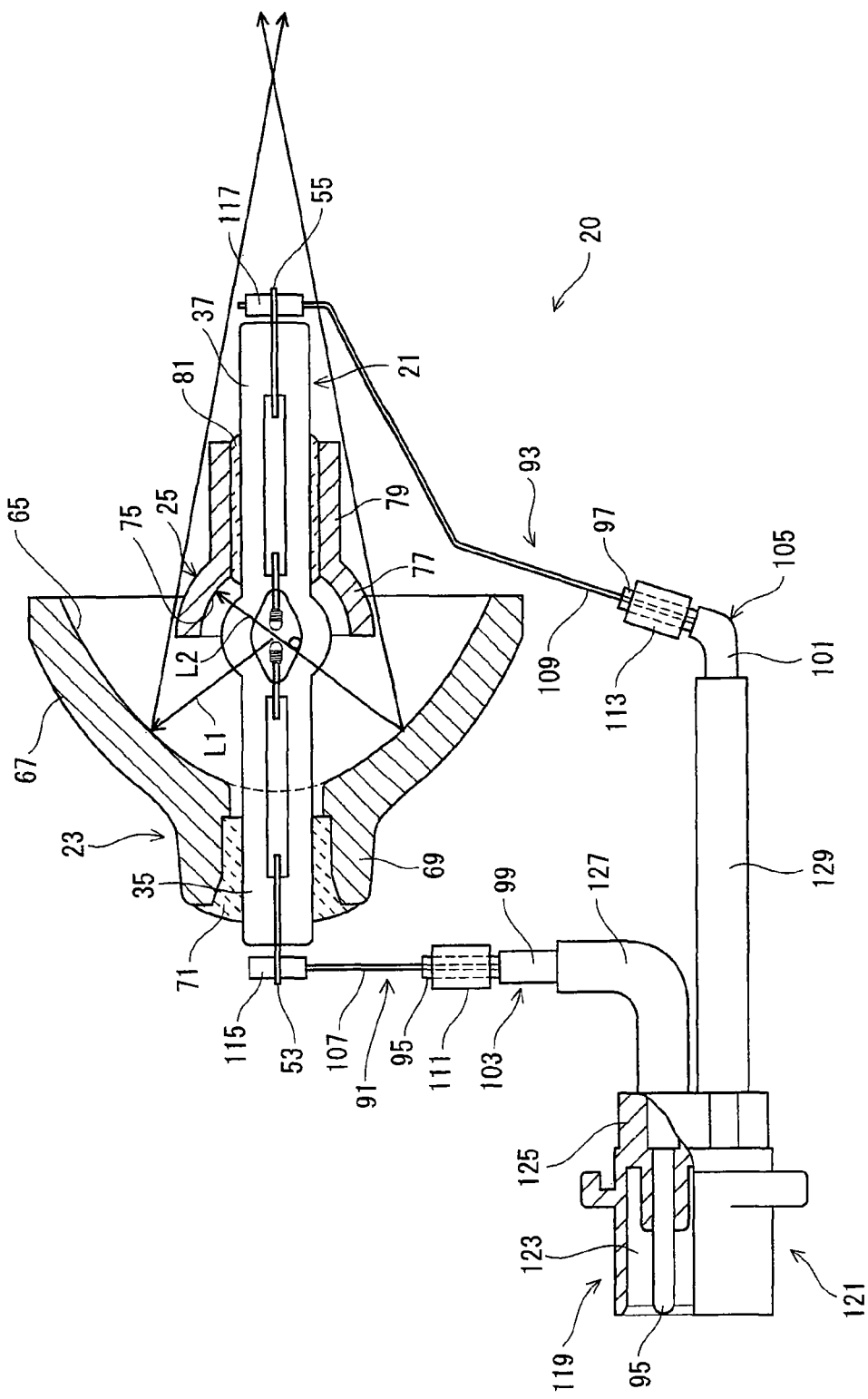
FIG. 1 shows the structure of a lamp unit pertaining to the first embodiment.

20 Lamp unit
21 Discharge lamp
23 Main reflecting mirror
25 Auxiliary reflecting mirror
33 light emitting part
35 First sealing part
37 Second sealing part
39 Glass bulb
45 First electrode
47 Second electrode
75 Reflecting surface
130 150 Projector

BEST MODE FOR CARRYING OUT THE INVENTION

<First Embodiment>

The following explains a high-pressure discharge lamp having a reflecting mirror pertaining to the first embodiment of the present invention, a lamp unit that uses the high-pressure discharge lamp, and a projector that uses the lamp unit, with reference to the drawings.

1. Lamp Unit

FIG. 1 shows the structure of a lamp unit pertaining to the first embodiment. To shows the internal structure, the main reflecting mirror, the auxiliary reflecting mirror, and so on are partially cut away. Note that FIG. 1 does not depict the electrical wiring pertaining to the lamp unit, and so on.

As FIG. 1 shows, a lamp unit 20 includes a high-pressure discharge lamp 21 (hereinafter simply called "lamp 21"), a main reflecting mirror 23 that reflects toward the object to be irradiated a light ray L1 emitted from the lamp 21 in the opposite direction of the object, and an auxiliary reflecting mirror 25 that reflects toward the main reflecting mirror 23 a light ray L2 emitted from the lamp 21 in the direction of the object.

The lamp unit 20 is connected with a power source unit 131, which will be explained later, via a pair of lead wires 91 and 93 connected with external lead wires 53 and 55 extended from the both ends of the lamp 21, and connectors 119 and 121 connected with the other ends of the lead wires 91 and 93.

2. Components (1) Lamp

Figure 2:
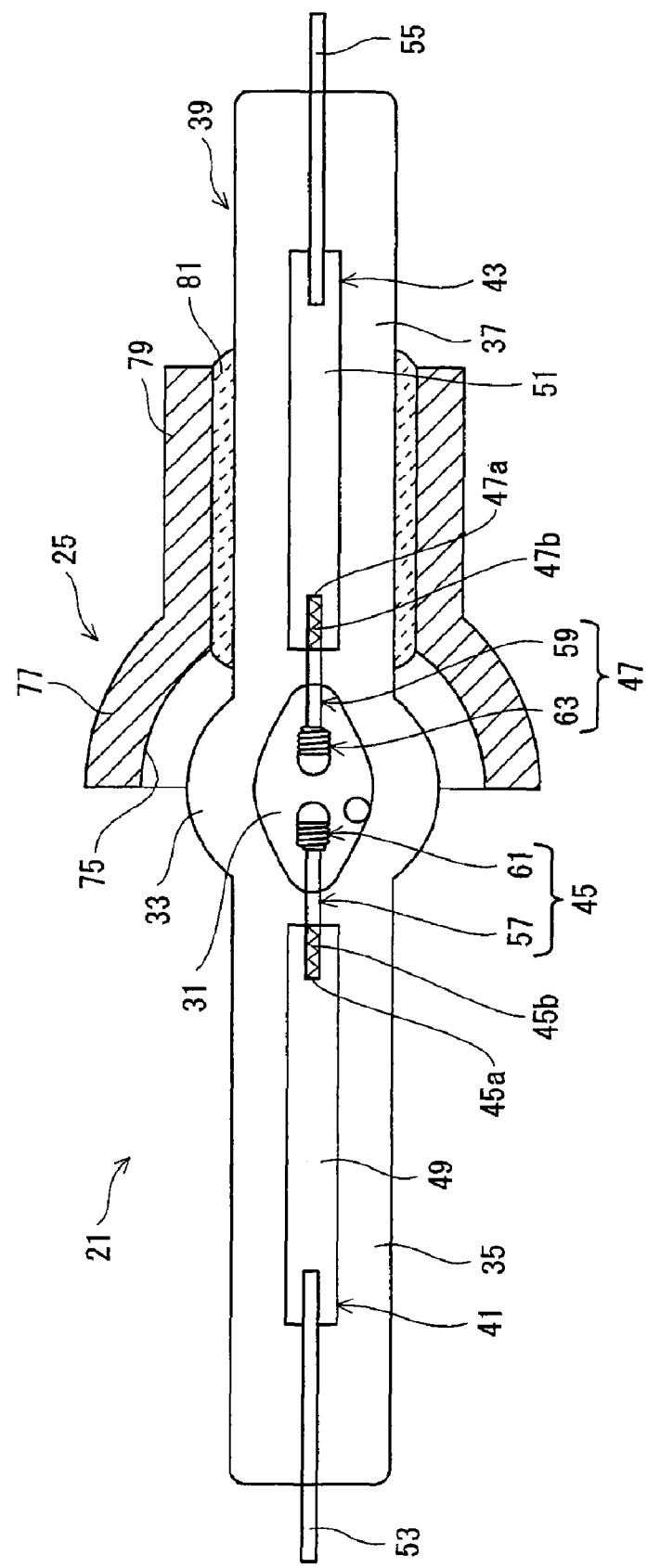
FIG. 2 shows the structures of a lamp and an auxiliary reflecting mirror.

FIG. 2 shows the structures of the lamp and the auxiliary reflecting mirror.

As FIG. 2 shows, the lamp 21 includes a glass bulb 39 and first and second electrode members 41 and 43. The glass bulb 39 includes a light emitting part 33 having a discharge space 31 therein, and first and second sealing parts 35 and 37 extended from the light emitting part 33. The first and the second electrode members 41 and 43 are respectively sealed with the first and the second sealing parts 35 and 37 such that the tips (electrode coils 61 and 63, which will be described later) of the first and the second electrode members 41 and 43 oppose each other within the discharge space 31. The discharge space 31 is filled with mercury as a light emitting substance, a rare gas for the support of the starting of the lamp, and a halogen gas for the halogen cycle.

The first and the second electrode members 41 and 43 include first and second electrodes 45 and 47, first and second metal foils 49 and 51 and first and second external lead wires 53 and 55, which are connected together in this order, by welding for example.

The first and the second electrodes 45 and 47 include first and second electrode shafts 57 and 59, and first and second electrode coils 61 and 63 which are provided at the tips of the first and the second electrode shafts 57 and 59. The first and the second electrode shafts 57 and 59 are made of tungsten, for example. It does not matter whether or not the first and the second electrode coils 61 and 63 are made of the same material as the material of the first and the second electrode shafts 57 and 59.

In the discharge space 31, the tips (the first and the second electrode coils 61 and 63) of the first and the second electrodes 45 and 47 oppose each other in the same straight line as the first and the second electrode shafts 57 and 59 (i.e. the axis centers of the first electrode shaft 57 and the second electrode shaft 59 match each other). The other ends of the first and the second electrodes 45 and 47 are positioned within the first and the second sealing parts 35 and 37.

The lamp 21 is of the so-called short-arc type. The inter-electrode distance (i.e. the gap between the first electrode coil 61 and the second electrode coil 63) is from 0.5 mm to 2.0 mm so that the lamp substantially serves as a point light source.

The first and the second metal foils 49 and 51 are respectively connected with the one ends within the first and the second sealing parts 35 and 37, of the first and the second electrodes 45 and 47. The first and the second metal foils 49 and 51 are sealed within the first and the second sealing parts 35 and 37. The first and the second metal foils 49 and 51 are made of molybdenum, for example.

The first and the second external lead wires 53 and 55 are extended to the outside of the glass bulb 39 from the one end surfaces opposite to the light emitting part 33, of the first and the second sealing parts 35 and 37.

(2) Main Reflecting Mirror

As FIG. 1 shows, the main reflecting mirror 23 includes a main reflecting mirror body 67 and a lamp holding part 69. The main reflecting mirror body 67 is in the funnel shape for example, and a concave reflecting surface 65 is formed on the inner side. The lamp holding part 69 is in the cylindrical shape, and is extended from the central back face of the main reflecting mirror body 67 (i.e. the bottom part of the main reflecting mirror body 67 and the opposite to the reflecting surface 65) to the outside along the optical axis of the reflecting mirror.

The main reflecting mirror 23 holds the first sealing part 35 of the lamp 21. Specifically, the first sealing part 35 of the lamp 21 has been movably inserted in the lamp holding part 69 of the main reflecting mirror 23, and an adhesive agent 71 is filled within the gap between the lamp holding part 69 and the first sealing part 35 to fix the lamp 21. Examples of the adhesive agent 71 include an inorganic adhesive composed mostly of, silica, alumina or silica-alumina. An example product of such an inorganic adhesive is SUMICERAM S, which is a product of ASAHI Chemical Co., Ltd.

The main reflecting mirror 23 is, for example, a dichroic reflecting mirror made of hard glass. The reflecting surface 65 of the main reflecting mirror 23 is, for example, a dielectric multilayer (e.g. $TiO_2/SiO_2$ and $Ta_2O_5/SiO_2$) formed through the vacuum deposition method. The reflecting surface 65 of the main reflecting mirror 23 reflects the visible light, emitted from the light emitting part 33 of the lamp 21, toward the object to be irradiated. Infrared rays pass through the main reflecting mirror 23.

(3) Auxiliary Reflecting Mirror

As FIG. 1 and FIG. 2 show, the auxiliary reflecting mirror 25 includes an auxiliary reflecting mirror body 77 and a cylindrical part 79. The auxiliary reflecting mirror body 77 is in the funnel shape for example, and a concave reflecting surface 75, which is corrected based on a spherical surface, is formed on the inner side. The cylindrical part 79 is in the cylindrical shape, and is extended from the central back face of the auxiliary reflecting mirror body 77 (i.e. the bottom part of the main reflecting mirror body 77 and the opposite to the reflecting surface 75) to the object to be irradiated.

The auxiliary reflecting mirror 25 is attached to the second sealing part 37 of the lamp 21. Specifically, the second sealing part 37 of the lamp 21 has been movably inserted in the cylindrical part 79 of the auxiliary reflecting mirror 25, and the auxiliary reflecting mirror is fixed such that the center point of the spherical surface, based on which the reflecting surface 75 has been corrected, and the center point (i.e. the light emission center) between the first and the second electrodes 45 and 47 (i.e. the electrode coils 61 and 63) of the lamp 21 are at the same point.

Figure 3:
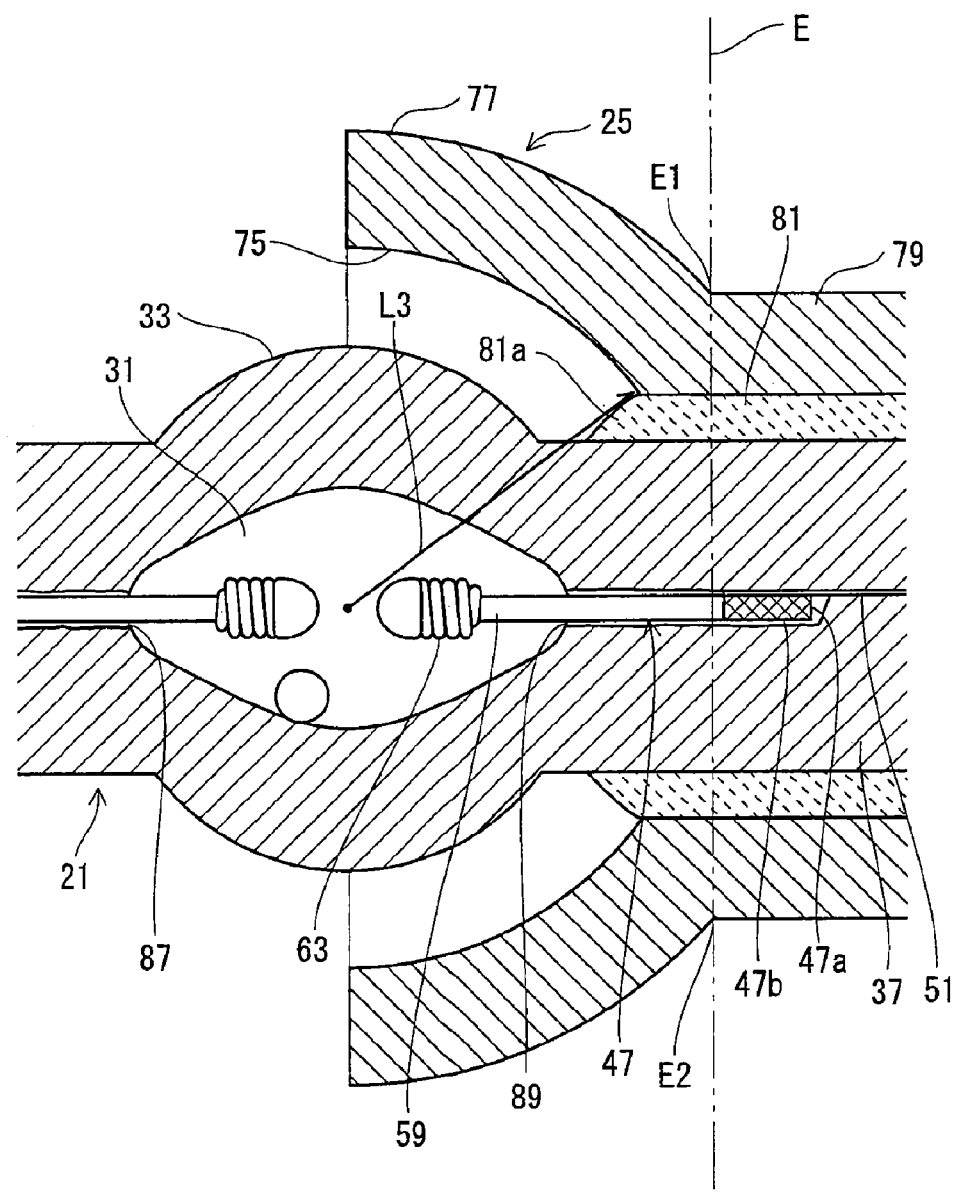
FIG. 3 is an enlarged figure of a vicinity of a light-emitting part of the lamp.

FIG. 3 is an enlarged figure of a vicinity of the light-emitting part of the lamp. As FIG. 2 and FIG. 3 show, in the state described above, an electrode end 47a of the second electrode 47 is located within the second sealing part 37, between the base end and the extended end of the cylindrical part 79.

Note that the cylindrical part 79 of the auxiliary reflecting mirror 25 corresponds to the part on the right side of the two-dot chain line E in FIG. 3, and the auxiliary reflecting mirror body 77 corresponds to the part on the left side of the two-dot chain line E. The two-dot chain line E is a line connecting the points E1 and E2 from which the outside diameter changes.

The auxiliary reflecting mirror 25 is fixed to the second sealing part 37 with an adhesive agent 81 filled in the gap between the cylindrical part 79 and the second sealing part 37. Examples of the adhesive agent 81 include an inorganic adhesive composed mostly of, silica, alumina or silica-alumina. An example product of such an inorganic adhesive is SUMICERAM S, which is a product of ASAHI Chemical Co., Ltd. The adhesive agent 81 is described in detail below.

The auxiliary reflecting mirror 25 is made of quartz glass for example. The reflecting surface 75 of the main reflecting mirror 25 is, for example, a dielectric multilayer (e.g. $TiO_2/SiO_2$ and $Ta_2O_5/SiO_2$) formed through the vacuum deposition method. The reflecting surface 75 of the auxiliary reflecting mirror 25 reflects the visible light, emitted from the light emitting part 33 of the lamp 21 toward the object to be irradiated, to the reflecting surface 65 of the main reflecting mirror 23. Infrared rays pass through the auxiliary reflecting mirror 25. Note that the reflecting surface 75 is obtained as a result of the correction made to a spherical surface. The method for the correction is explained in detail below.

As FIG. 1 shows, the lead wires 91 and 93 include coated conductive wires 103 and 105 and nickel lines 107 and 109. The coated conductive wires 103 and 105 include cores 95 and 97 which have electrical conductivity and are coated with coatings 99 and 101. The nickel lines 107 and 109 are connected with the cores 95 and 97 on the side to be connected to the external lead wires 53 and 55 of the lamp 21.

Regarding the cores 95 and 97 and the nickel lines 107 and 109, the cores 95 and 97 from which the coatings 99 and 101 have been peeled off are connected with the nickel lines 107 and 109 through overlapping of the cores 95 and 97 with the nickel lines 107 and 109 within connection sleeves 111 and 113 and swaging of the connection sleeves 111 and 113.

The lead wires 91 and 93 and the external lead wires 53 and 55 of the lamp 21 are connected through swaging of connection sleeve 115 and 117 in which the tips of the nickel lines 107 and 109 are inserted, and welding the connection sleeves 115 and 117 and the external lead wires 53 and 55 together.

The lead wire 91 (93) and the connector 119 (121) are connected together in such a manner that the coating 99 (101) is fixed to a fixing part 125 of the connector 119 (121) such that the core 95 (97) inside the coating 99 (101) is extended into the inside of the connection part 123 of the connector 119 (121). Note that the coated conductive wires 103 and 105 are further coated with protection tubes 127 and 129.

3. Operations

The following explains the manner of lighting of the lamp unit 20 having the stated structure.

As FIG. 1 shows, the lamp 21 lights up by causing an arc between the first and the second electrodes 45 and 47 (Hereinafter simply referred to as "between the electrodes" as well) within the light emitting part 33. A light ray L1 emitted from the arc between the electrodes toward reflecting surface 65 of the main reflecting mirror 23 travels straight to the outside of the lamp 21, and is reflected by the reflecting surface 65 toward the object to be irradiated. As a result, the light ray L1 is emitted from the lamp unit 20 in the predetermined direction.

On the other hand, a light ray L2 emitted from the arc between the electrodes toward the opposite of the main reflecting mirror 23, i.e. toward the reflecting surface 75 of the auxiliary reflecting mirror 25, travels straight to the outside of the lamp 21, and reflected by the reflecting surface 75 toward the main reflecting mirror 23 such that the light ray L2 passes through the light emitting part 33 and between the electrodes and reaches the reflecting surface of the main reflecting mirror 23. After that, the light ray L2 is reflected by the reflecting surface 65 of the main reflecting mirror 23. As a result, the light ray L2 is emitted from the lamp unit 20 in the predetermined direction.

Thus, the light emitted from the lamp unit 20 toward the object to be irradiated is a total of the light emitted from the lamp unit 20 toward the reflecting surface 65 of the main reflecting mirror 23 and the light emitted from the lamp 21 toward the reflecting surface 75 of the auxiliary reflecting mirror 25 and reflected by the reflecting surface 75. Therefore, the lamp unit 20 realizes a higher light collection efficiency than a lamp unit that is not equipped with the auxiliary reflecting mirror 25.

4. Reflecting Surface of Auxiliary Reflecting Mirror (1) Outline of Correction Method The auxiliary reflecting mirror 25 pertaining to this embodiment has the reflecting surface 75 corrected based on a spherical surface. This correction is made to have the light emitted from the pair of electrodes and reflected by the reflecting surface 75 pass between the first electrode 45 and the second electrode 47. In other words, this correction aims to prevent that the light from arriving at both the first and the second electrodes 45 and 47, or either one (45, 47) of them.

Figure 4A:
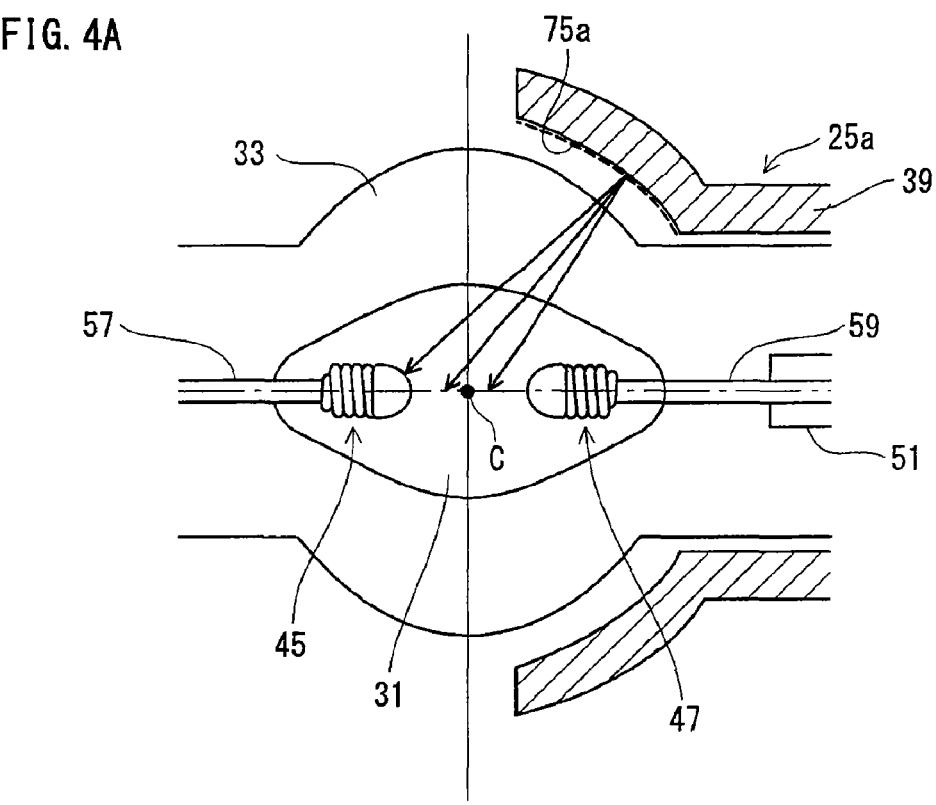
FIGS. 4A and 4B show paths of reflected light rays, where
Figure 4B:
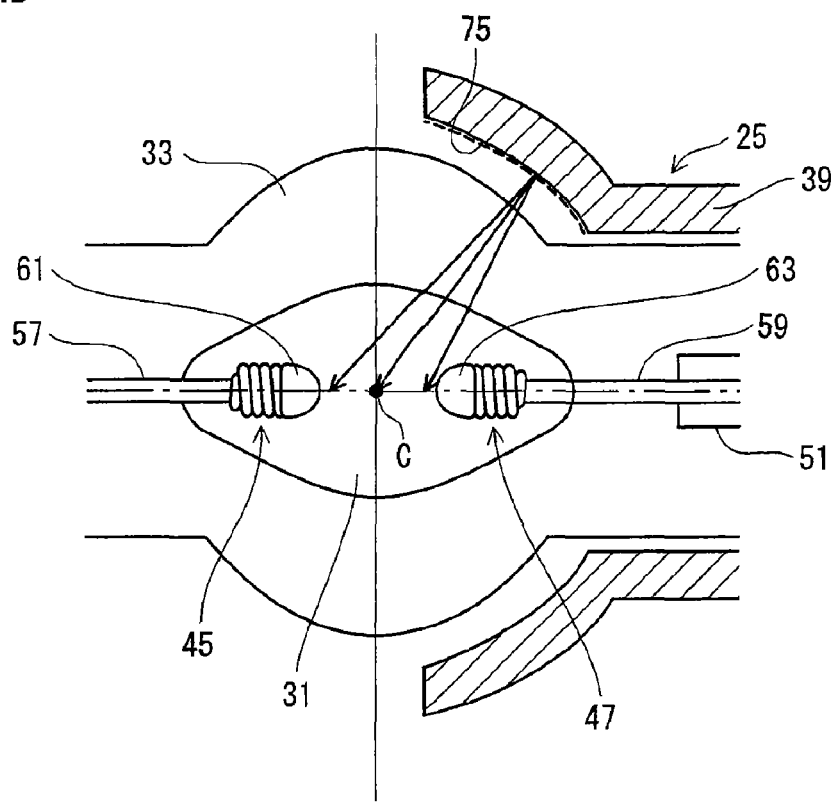

FIG. 4A and FIG. 4B show the paths of the light rays after the reflection. FIG. 4A shows the uncorrected path (i.e. the reflecting surface is still spherical), and FIG. 4B shows the corrected path. Note that the three rays shown in FIG. 4 are respectively emitted from the high-luminance positions S1 and S3 and the low-luminance position S2. The correction method applied here is the method in the case where the value "n" of "n rays emitted from n points on the axis center" is 3.

An auxiliary reflecting mirror 25a whose reflecting surface 75a is still spherical is attached to the lamp 21 as described above such that the light emission center of the lamp 21 is at the center of curvature of the reflecting surface 75a. In the case of not taking account of the refraction occurring between the discharge space 31 and the light emitting part 33 of the glass bulb 39 and the refraction occurring between the light emitting part 33 of the glass bulb 39 and the external air, the light ray emitted from the position S2 at the light emission center C is reflected by the auxiliary reflecting mirror 25a and passes through the position S2, and travels toward the main reflecting mirror 23.

In reality, however, as FIG. 4A shows, the light ray emitted from the position (S3) between the electrodes gets closer to the one of the electrodes, e.g. the first electrode 45, and reaches the first electrode 45 due to the refraction at the glass bulb 39 and soon, instead of returning to the center between the pair of electrodes (i.e. does not pass through the center between the electrodes).

In this embodiment, the reflecting surface is corrected such that the light ray, which reaches the first electrode 45 in FIG. 4A, is prevented from reaching the first electrode 45 as FIG. 4B shows. Specifically, in the case of the reflecting mirror 25a having the spherical reflecting surface 75a, the light rays emitted from the three positions S1, S2 and S3 and reflected by the reflecting surface 75a are shifted by a given amount toward the other electrode (on the right side in FIG. 4B) namely the second electrode 47.

Figure 5A:
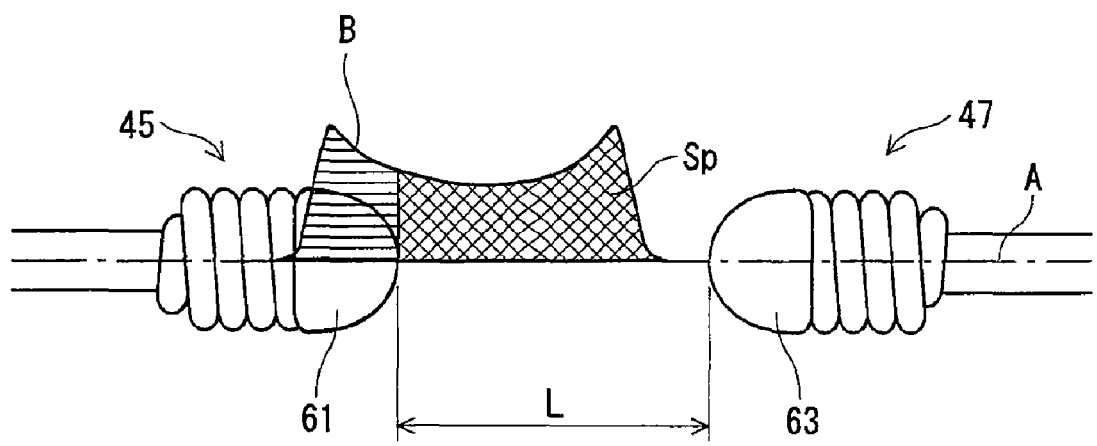
FIGS. 5A and 5B show illumination distributions of light reflected by a reflecting mirror measured between the electrodes before and after the correction, where
Figure 5B:
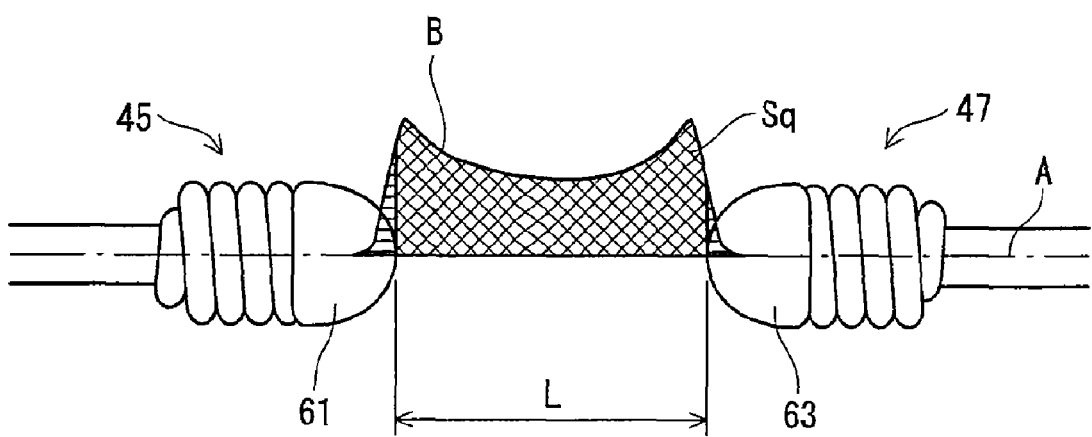

FIGS. 5A and 5B show illumination distributions of light reflected by the reflecting mirror measured between the electrodes before and after the correction. FIG. 5A shows the illumination distribution before the correction, and FIG. 5B shows the illumination distribution after the correction.

The correction of the spherical reflecting surface 75 is made such that, within an area (hereinafter called "illumination area") that is surrounded by a line segment A (the chain line in the drawings) between the tips of the first and the second electrodes 45 and 47 and an illumination curve showing illuminance values on the line segment A, an area (hereinafter called "corresponding area" for distinction from the illumination area) that corresponds to the length ("L" in the drawings) between the electrodes increases (to the maximum, substantially). Note that the line segment A is in line with both the axis center of the first electrode 45 (i.e. the axis center of the electrode shaft 57) and the axis center of the second electrode 47 (i.e. the axis center of the electrode shaft 59).

In the case of FIG. 5A and FIG. 5B, the illumination area of the uncorrected reflecting mirror 25a is the sum of the cross-hatching part and the lateral hatching part shown in FIG. 5A, and the corresponding area Sp is the cross-hatching part. The illumination area of the corrected reflecting mirror is the sum of the cross-hatching part and the lateral hatching part shown in FIG. 5B, and the corresponding area Sq is the cross-hatching part. In this way, the corresponding area Sq after the correction shown in FIG. 5B is larger than the corresponding area Sp without the correction shown in FIG. 5A.

That is, the correction pertaining to the present invention aims to change the illumination distribution shown in FIG. 5A, which is closer to the first electrode 45, to the illumination distribution shown in FIG. 5B, which is between the electrodes.

(2) Calculation of the Given Amount

In this embodiment, an area is calculated based on the illuminance values, measured between the electrodes, of the light rays emitted from three points, namely the positions S1 and S3, which show the peaks of the luminance in the luminance distribution BK of FIG. 15B, and the position S2, which shows the lowest-luminance position between the positions S1 and S3.

This area is assumed as the illumination area surrounded by the illumination curve B and the line segment A of FIG. 5A and FIG. 5B. Within this assumed illumination area, the corresponding area that overlaps the area between the electrodes is increased to the maximum. Note that the lowest-luminance position S2 is at the center point between the electrodes (i.e. the light emission center C).

Figure 6:
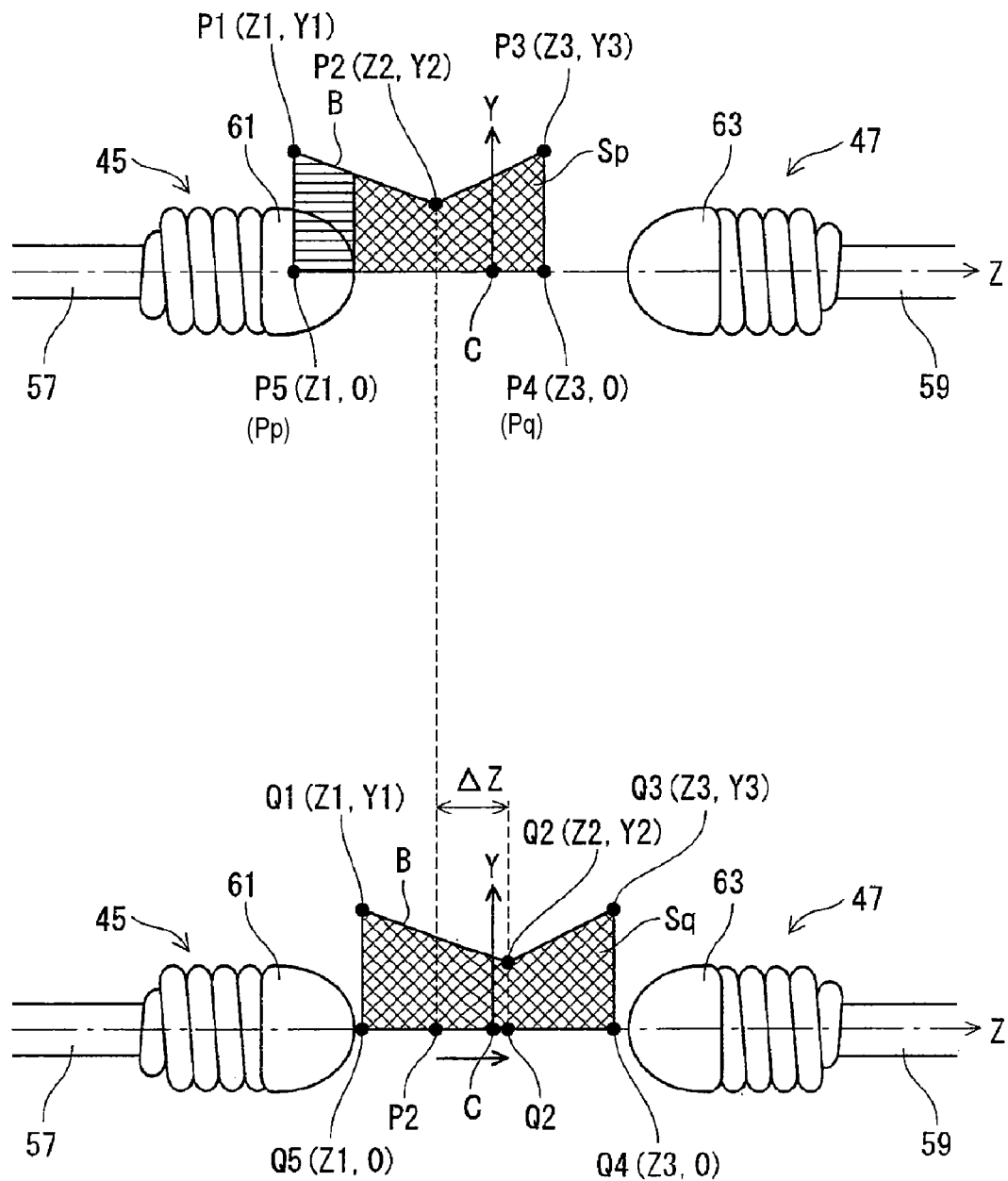
FIG. 6 shows an illumination area between a pair of electrodes, pertaining to the first embodiment.

FIG. 6 shows the illumination area between the pair of electrodes, pertaining to the first embodiment.

The illumination area is defined as an closed region surrounded by line segments formed by connecting points P1(Z1, Y1), P2(Z2, Y2), P3(Z3, Y3); P4(Z3, 0) and P5(Z1, 0) on a ZY coordinates in this order. In the ZY coordinates, the Z-axis extends in the direction of the line segment A between the tips of the electrodes, and the Y-axis passes through the center point between the electrodes on the Z-axis and extends in the direction orthogonal to the Z-axis. The XY coordinates show the illuminance values of light rays emitted from the pair of electrodes and reach the Z-axis. Here, the point P4 is equivalent to the point Pp pertaining to the present invention, and the point P5 is equivalent to the point Pq pertaining to the present invention.

Z1, Z2 and Z3 are values of points on the Z-axis, where the light rays emitted from the positions S1, S2 and S3 shown in FIG. 15 intersect with the Z-axis. Y1, Y2 and Y3 are illuminance values of the light rays emitted from the positions S1, S2 and S3, reflected at an arbitrary point Pt on the reflecting surface 75 and reach the Z-axis. These values can be obtained through computer analysis.

Next, as FIG. 6 shows, the corresponding area Sp (the cross-hatching part in the drawing) is obtained based on the illumination area. Then the corresponding area after the shifting along the Z-axis without changing the closed shape is obtained. After that, an amount Δ of the shifting at the time the corresponding area is substantially the maximum (i.e. the corresponding area Sq represented with the cross-hatching illustrated in the lower part of FIG. 6) is obtained. This amount Δ is the given amount mentioned above. In FIG. 6, for the purpose of differentiation, each of the coordinate points before the correction is represented with P and each of the coordinate points after the correction is represented with Q.

After the calculation of the shift amount Δ, the reflecting surface at the arbitrary point Pt is corrected such that illumination distribution of the light rays emitted from the positions S1, S2 and S3 and reflected by the reflecting surface will be shifted to the illumination distribution represented as the closed region.

(3) Method for Calculation of Correction Angle

Figure 7:
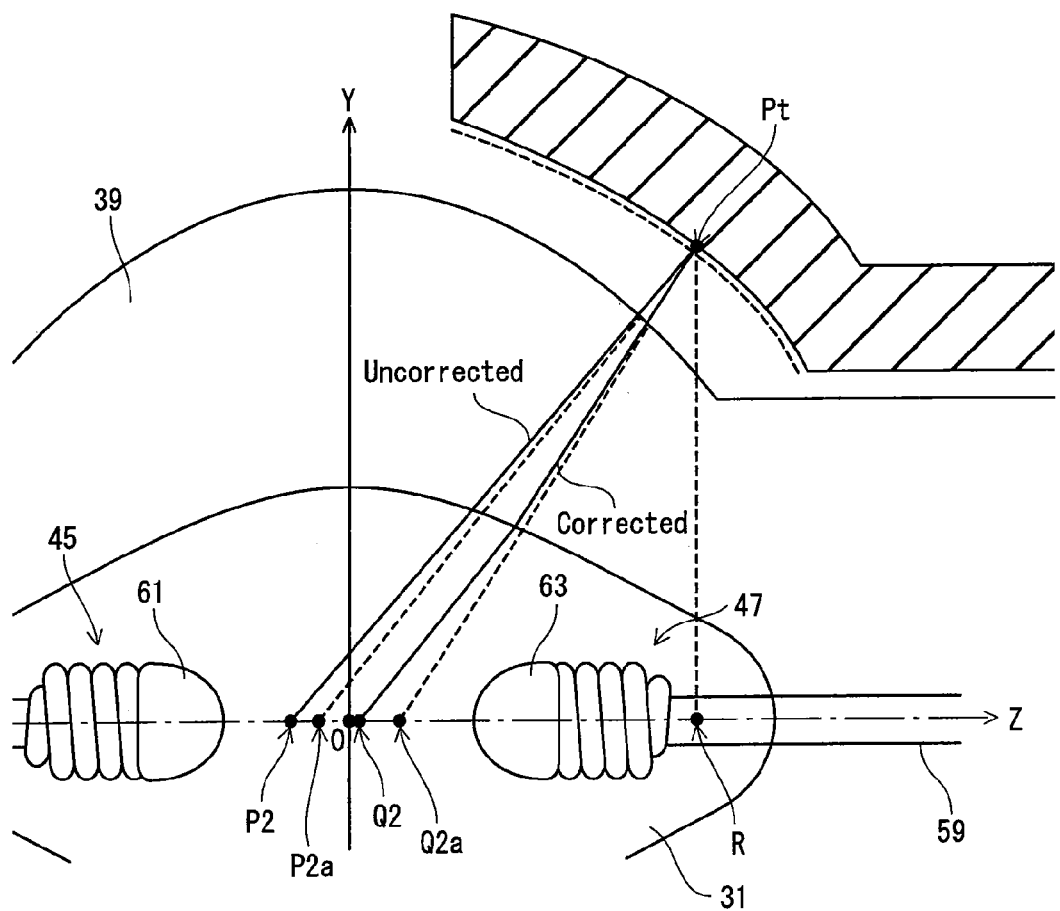
FIG. 7 is a drawing for explaining calculation of a correction angle at a point Pt on a reflecting surface.

FIG. 7 is a drawing for explaining calculation of a correction angle at the point Pt on the reflecting surface.

In FIG. 7, the path of the light ray before the correction and the path of the light ray after the correction are depicted in solid lines. The path before the correction represents the middle one of the three light paths shown in FIG. 4A, and the path after the correction represents the middle one of the three light paths shown in FIG. 4B.

Regarding the light paths depicted in the solid lines, the refraction occurring while the light ray from the arbitrary reflecting point Pt passes through the glass bulb 39 and enters the discharge space 31 is taken into consideration. If such refraction is not taken into consideration, the light paths can be depicted as the broken lines, which show that the light travel straight to the Z-axis thorough the thick part of the glass bulb 39 (between the inside diameter and the outside diameter of the light emitting part 33).

Here, the correction angle θ is the difference between the apex angle of the rectangular triangle that connects the point Pt (Za,Ya), the point P2a(Zpa, 0) and the point R(Za, 0) (i.e. the rectangular triangle with the base Za–Zpa, the height Ya, and the apex Pt) and the apex angle of the rectangular triangle that connects the point Pt(Za,Ya), the point Q2a(Zqa, 0) and the point R(Za, 0) (i.e. the rectangular triangle with the base Za–Zqa, the height Ya, and the apex Pt). In a mathematical expression:

$$\theta = \tan^{-1}(Za-Zpa)/Ya - \tan^{-1}(Za-Zqa)/Ya.$$

(4) Reflecting Surface

The correction angle θ at the arbitrary point Pt can be obtained as explained above. Thus, it is possible to make the correction of the reflecting surface 75 by firstly obtaining a corrected reflecting curve (included in a plane) by repeating the correction made at the point Pt as to predetermined points (positions) on a curved (arc-shaped) line in a plane that passes the center of the spherical surface, and rotating the reflecting curve with respect to the Z-axis.

(5) Effects

According to the correction explained above, the light rays emitted from the positions S1, S2 and S3 between the electrodes and on the common axis of the electrodes. With such a precise correction, it is possible to obtain the luminance distribution that is close to the luminance distribution of the actual arc generated in a practical lamp.

With the corrected auxiliary reflecting mirror 25 instead of the uncorrected reflecting mirror 25a, it is possible to prevent the reflected light rays from reaching (colliding against) the first and the second electrodes 45 and 47, and suppressing the rise in temperatures of the first and the second electrodes 45 and 47. This realizes a long life of the lamp 21.

Also, since the corrected auxiliary reflecting mirror 25 can prevent the reflected light rays from reaching (colliding against) the first and the second electrodes 45 and 47, it can increase the reflected light rays that pass between the electrodes and reach the main reflecting mirror 23 compared to the uncorrected reflecting mirror 25a. Consequently, it is possible to improve the light collection efficiency and the light utilization rate of the lamp unit 20.

In a simulation using the uncorrected auxiliary reflecting mirror 25a and the corrected auxiliary reflecting mirror 25, it has been found that the light collection efficiency of the corrected auxiliary reflecting mirror 25 is 3% higher than the light collection efficiency of the uncorrected auxiliary reflecting mirror 25a.

5. Attaching Auxiliary Reflecting Mirror

As FIG. 2 shows, the first and the second metal foils 49 and 51 exist between the first and the second electrodes 45 and 47 and the external lead wires 53 and 55, and the first and the second metal foils 49 and 51 sealed with the first and the second sealing parts 35 and 37 such that the discharge space 31 is hermetically-closed.

This is for the following reasons. Generally, the first and the second electrodes 45 and 47 are made of a metal rod (e.g. tungsten), and there are gaps 87 and 89 between the first and the second electrodes 45 and 47 and the first and the second sealing parts 35 and 37 as FIG. 3 shows. Since the first and the second metal foils 49 and 51 are made of metal foils (e.g. molybdenum), there tends to be no gap between the first and the second metal foils 49 and 51 and the first and the second sealing parts 35 and 37.

On the other hand, since the structures of joint parts 45b and 47b (the hatching parts shown in FIG. 2) between the first and the second electrodes 45 and 47 and the first and the second metal foils 49 and 51 are relatively complicated, there tend to be gaps 87 and 89 between the glass bulb 39 and them.

Since the gaps 87 and 89 are connected with the discharge space 31, the mercury vapor with in the discharge space 31 enters the gaps 87 and 89. Since the gaps 87 and 89 are away from the light emission center, their temperatures tend to be lower than the temperature of the discharge space 31. In particular, the temperatures of the vicinities of ends 45a and 47a of the first and the second electrodes 45 and 47 within the first and the second sealing parts 35 and 37, which are the farthest from the light emission center, tend to be low.

Moreover, when compared with the end 47a, the vicinity of the end 47a of the second electrode 47 tends to be the coolest point. This is because since the first sealing part 35 is connected with the main reflecting mirror 23, the second sealing part 37 tends to be cooler than the first sealing part 35, and the second electrode 47 is placed within the second sealing part 37.

In view of the above, to avoid that the end 47a of the second electrode 47 will be the coolest point, the adhesive agent 81 is filled in the whole gap between the second sealing part 37 and the cylindrical part 79, as FIG. 3 shows. This prevents the heat radiation from the glass bulb 39 to the atmosphere, and increases the temperature at the coolest point. As a result, it is possible to keep the vapor pressure in the discharge space 31 at high and improves the luminous efficiency of the lamp unit 20.

Note that if the adhesive agent 81 squeezes out onto the reflecting surface 75 of the auxiliary reflecting mirror 25, the adhesive agent 81 blocks the light from the light emitting part 33 to the reflecting surface 75 of the auxiliary reflecting mirror 25, and degrades the light collection efficiency of the lamp unit 20. Thus, as FIG. 3 shows, it is preferable that the adhesive agent 81 is filled in the part where it does not cut off the light ray L3 emitted from the light emitting part 33 to the reflecting surface 75 of the auxiliary reflecting mirror 25. In other words, it is preferable that an edge 81a of the adhesive agent 81 on the light emitting part side does not cut off the light ray L3.

Figure 8A:
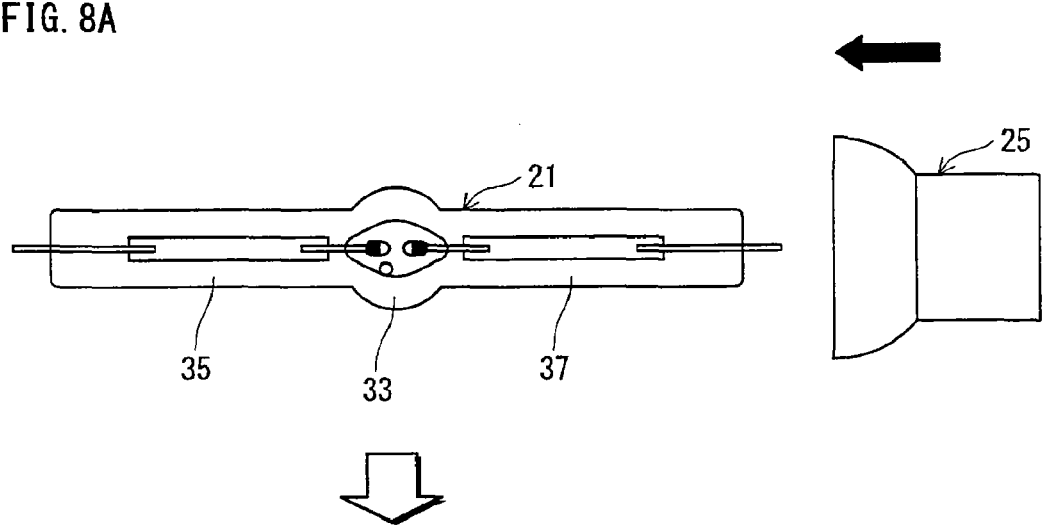
FIGS. 8A to 8C are a series of process charts showing processes for filling of an adhesive agent.
Figure 8B:
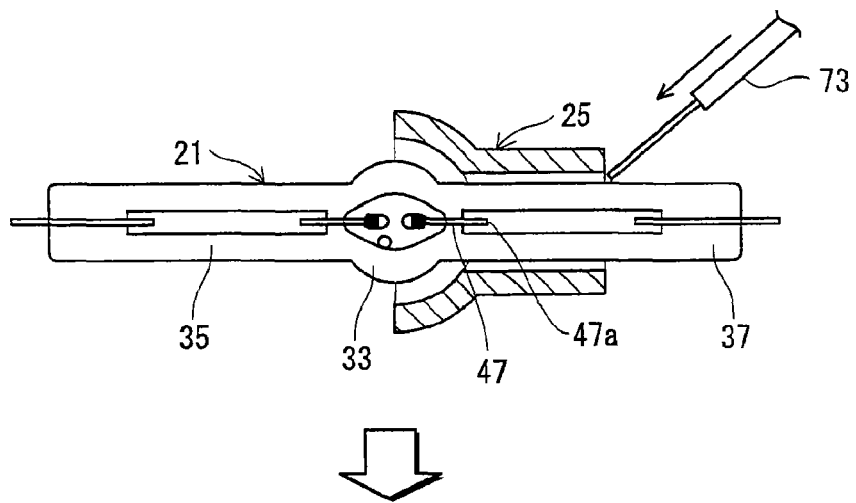
Figure 8C:
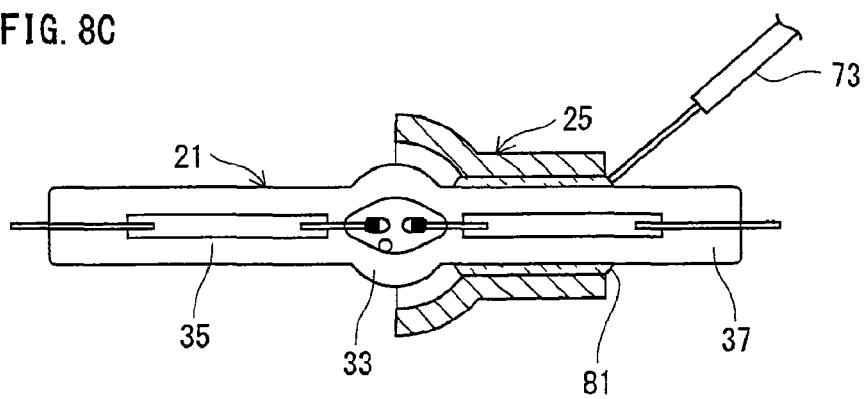

FIGS. 8A to 8C are a series of process charts showing processes for filling of the adhesive agent.

In the processes of filling the adhesive agent shown in FIGS. 8A to 8C, firstly, as FIG. 8A shows, the auxiliary reflecting mirror 25 is movably inserted in the second sealing part 37 of the lamp 21. In this regard, as FIG. 8B shows, assume that there is the end 47a within the second sealing part 37 of the second electrode 47, between the base end and the extended end of the cylindrical part 79. Next, as FIG. 8C shows, from the end of the cylindrical part 79 of the auxiliary reflecting mirror 25, the adhesive agent 81 is filled in the whole gap between the second sealing unit 37 and the cylindrical part 79, with a filling machine 73.

In the processes of the filling, the adhesive agent 81 does not evenly fill the whole gap between the second sealing part 37 and the cylindrical part 79 in some cases.

<Second Embodiment>

The first embodiment above has explained the lamp unit. The second embodiment explains an example of a projector that uses the lamp unit having the stated structure (i.e. the "projection type image display apparatus" pertaining to the present invention).

Figure 9:
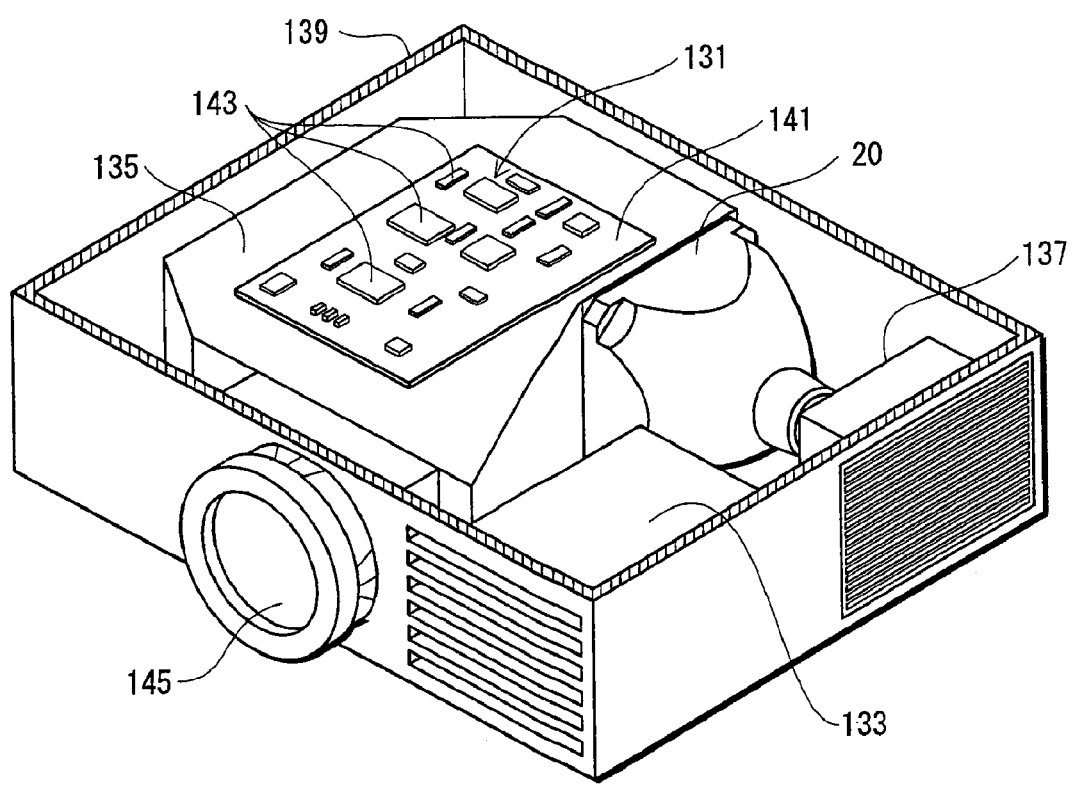
FIG. 9 is a partially cut-away perspective view of a projector pertaining to the second embodiment.

FIG. 9 is a partially cut-away perspective view of the projector pertaining to the second embodiment.

As FIG. 9 shows, a projector 130 pertaining to the second embodiment is a so-called front-projection type projector. The projector 130 includes the lamp unit 20 pertaining to the first embodiment, a power source unit 131 that includes an electronic ballast for lighting up the lamp, a control unit 133, a lens unit 135 that includes a lens system and a transmissive color liquid crystal display plate, and a cooling fan device 137, which are housed within a casing 139. Note that the lens unit 135 is partially protrude to the outside the casing 139.

The power unit 131 converts an AC 100V home-use power source to a predetermined voltage, and provides it to the electronic ballast, the control unit 133, and so on. Note that the power unit includes a substrate 141 placed on the lens unit 135 and a plurality of electronic and electrical components 143 implemented on the substrate 141.

The control unit 133 displays color images by driving the color liquid crystal display plate, based on image signals input from the outside. The control unit 133 also controls a drive motor disposed in the lens unit 135 to perform focusing and zooming.

The light rays emitted from the lamp unit 20 passes through the lens system disposed in the lens unit 135, and passes through the color liquid crystal display plate disposed on the way to the light paths. As a result, the image formed on the color liquid display plate is projected on the screen, which is not illustrated within the drawing, via the lens 145 and so on.

MODIFICATION EXAMPLES

The auxiliary reflecting mirror, the lamp unit, and the projection type image display apparatus that pertain to the present invention have been explained above based on the embodiments of the present invention. However, the auxiliary reflecting mirror and se on pertaining to the present invention are not limited to those explained in the embodiments above, as a matter of course.

1. Auxiliary Reflecting Mirror
(1) Correction Method
(1-1) Illumination Area

In the first embodiment, the illumination area exists between the tips of the pair of electrodes, as the lower part of FIG. 6 shows. In other words, the reflected light rays pass between the pair of electrodes without reaching the electrodes (e.g. In the lower part of FIG. 6, the electrodes does not overlap the illumination area).

However, in some cases, the illumination area after the correction might not exist between the tips of the pair of electrodes. In other words, the reflected light rays might reach the electrodes. Specifically, the Z-axis value of the point P1 might exist on the side of the electrode 45, depending on the angle formed by the line segment that connects the arbitrary point Pt to be corrected and the light emission center C, and the line segment A (i.e. the Z-axis in FIG. 6) that connects the tips of the electrodes, the thickness of the glass bulb that the reflected light rays pass through, and so on.

The following explains a modification example 1a of the correction for the case the illumination area does not exist between the tips of the pair of electrodes.

FIG. 10A is a drawing for explaining the correction method pertaining to the modification example 1a.

In the modification example 1a, the illumination area is calculated based on three points, namely the points P1, P2 and P3, in the same manner as in the first embodiment. The points P4 and P5 have the same Z values as the points P3 and P1, respectively, as in the first embodiment.

Also in the modification example 1a, the shift amount AZ is calculated such that the corresponding area Sq (the cross-hatching part in the lower part of FIG. 10A) becomes the maximum based on the shape, the illumination area and the corresponding area Sp (the hatching part in the upper part of FIG. 10A) of the part surrounded by the Z-axis and the illumination curve of the light rays reflected by the spherical reflecting surface.

In this way, even in the case the light rays emitted from a point between the pair of electrodes are reflected by the reflecting mirror and some of the light rays are shifted largely toward the electrode 45 (Since Z1 is shifted toward the electrode 45, the illuminance at the point P1 is lower than the illuminance at the point P3), the illumination distribution will be that shown in the lower part of FIG. 10A shows as a result of the correction in the same manner as in the embodiments.

In such case, it is possible to reduce the amount of light that reach the electrode 45, and prevent the rise of the temperature of the electrode 45. Also, it is possible to reduce the luminous flux loss. Note that the luminous flux loss is the lateral hatching part in FIG. 10A. In comparison between the upper part and the lower part in FIG. 10A, the area with the lateral hatching part (i.e. luminous flux loss) in the lower part in FIG. 10A is smaller than the other.

(1-2) The Number of Light Emission Points

In the first embodiment, the illumination area is calculated with use of the light rays emitted from the positions S1, S2 and S3 shown in FIG. 15, based on the assumption that the illumination curve B is in the "M" shape as FIG. 6 shows. Here, the points that are subject to the correction are not limited to the three points P1, P2 and P3 corresponding to the positions S1, S2 and S3. The number of the points may be more than five. Also, the number of the light emission points (such as the positions S1, S2 and S3) maybe further increased such that they are substantially the same as the illumination curve shown in FIG. 15.

The first embedment explains the case where "n" is 3 in the recitation "$i^{th}$ reflection light ray, which has been emitted from an $i^{th}$ one of $1^{st}$ to $n^{th}$ points (n≧3) arranged in the common axis in number order". Since n is a natural number that is no less than 3, n may be a natural number that is larger than 5, for example.

The following explains a modification example 1b, where the number of light emission points is 5 (i.e. n=5) and the illumination curve is assumed based on the five points.

FIG. 10B is a drawing for explaining a correction method pertaining to the modification example 1b.

In the modification example 1b, the illumination area is calculated based on five points, namely points P1, P2, P3, P4 and P5. Here, the points P2 and P4 correspond to the peaks of the luminance, the point P3 corresponds to the lowest luminance between the pair of electrodes (the point P3 is the center point between the part of the electrodes at the same time).

The point P1 is at a position included within the tip of the electrode 45, where the luminance is substantially "0". The luminance at the point P2 is also substantially "0".

The illumination area is defined as an closed region surrounded by line segments formed by connecting points P1(Z1, Y0), P2(Z2, Y2), P3(Z3, Y3), P4(Z4, Y4) and P5(Z5, 0) on a ZY coordinates in this order. In the ZY coordinates, the Z-axis extends in the direction of the line segment A between the tips of the electrodes, and the Y-axis passes through the center point between the electrodes on the Z-axis and extends in the direction orthogonal to the Z-axis. The XY coordinates show the illuminance values of light rays emitted from the pair of electrodes and reach the Z-axis. Here, the point P5 is equivalent to the point Pp pertaining to the present invention, and the point P1 is equivalent to the point Pq pertaining to the present invention.

Also in the modification example 1b, the shift amount ΔZ is calculated such that the corresponding area Sb (the cross-hatching part in the lower part of FIG. 10B) becomes the maximum based on the shape, the illumination area and the corresponding area Sa (the cross-hatching part in the upper part of FIG. 10B) included in the part surrounded by the Z-axis and the illumination curve of the light rays reflected by the spherical reflecting surface. In FIG. 10B, the coordinate points before the correction are represented with P, and the coordinate points after the correction are represented with Q in order to distinguish between the coordinate points before and after the correction.

In this modification example, the points Pp and Pq of the present invention are the identical with the points P5 and P1 respectively. Since the area surrounded by the line segments formed by connecting the points P1 to P5 in this order and the area surrounded by the line segments formed by connecting the points P1 to P5 and Pp, Pq and P1 are identical, the correction method pertaining to the present invention are not affected.

In the embodiments and the modification example 1b, the auxiliary reflecting mirror is attached to the lamp such that the light emission center of the lamp is identical with the center point of the spherical surface, which is the reference point for the correction of the reflecting surface. However, for example, even in the case the auxiliary reflecting mirror is attached to the lamp such that the light emission center is not identical with the center point of the spherical surface, which is the reference point for the correction of the reflecting surface, it is possible to obtain the reflecting mirror pertaining to the present invention (it is preferable that the displacement is caused along the common axis of the pair of electrodes (i.e. the Z-axis in FIG. 6)).

Specifically, even in the case the auxiliary reflecting mirror is attached to the lamp such that the light emission center is not identical with the center point of the spherical surface, it is possible to achieve the same advantageous effect by calculating the corresponding area with use of the light rays emitted from at least three points between the electrodes and reflected at the point Pt, and making the correction such that the corresponding area will be substantially the maximum.

This example explains the case where "n" is 5 and the points Pp and pq pertaining to the present invention are the same as the points P1 and P5 respectively. However, as a matter of course, the present invention is also applicable to the case where "n" is 5 or more and the points Pp and Pq are not the same as the points P1 and P5.

(2) Material

The material of the auxiliary reflecting mirror is not limited to quartz glass. For example, the auxiliary reflecting mirror may be made of hard glass, ceramics, or metal.

The material of the auxiliary reflecting mirror is not limited to that transmits infrared rays, and it may absorb infrared rays. For example, the auxiliary reflecting mirror may be made of a material whose infrared transmission rate is 90% or less. Conventionally, quartz glass, whose infrared transmission rate is 95% or more have been used for the auxiliary reflecting mirror. However, if the auxiliary reflecting mirror is made of a material of whose infrared transmission rate is 90% or less, it is possible to increase the amount of the infrared absorption. The auxiliary reflecting mirror absorbing the infrared rays radiates heat which increases the temperature of the lamp. Consequently, the temperature in the discharge space rises and the vapor pressure increases. This improves the luminous efficiency of the lamp.

Since the wave length of the infrared rays radiated from the lamp is generally shorter than 900 nm, the auxiliary reflecting mirror may be made of a material that absorbs infrared rays whose wave length is from 650 nm to 900 nm. However, even in the case the auxiliary reflecting mirror is made of a material that absorbs infrared rays whose wave length is longer than 900 nm and not longer than 1500 nm, it is possible to improve the luminous efficiency to some extent by using the radiated heat.

Further, to improve the absorption rate of the infrared rays, the auxiliary reflecting mirror may be made black. For example, the auxiliary reflecting mirror may be made of black quartz glass manufactured by filling a slurry quartz glass in which a carbon has been mixed in a mold, and baking and polishing it. Also, other colors that have the infrared absorption rate at the similar level as the black color may be used.

Also, the auxiliary reflecting mirror may include a reflecting surface that reflects only visible light rays, and an absorption surface that has been formed under the reflecting surface and absorbs infrared rays to radiate heat.

(3) Attaching (3-1) Part to be Filled with Adhesive Agent

The following explains a modification example of the part to be filled with the adhesive agent 81. The structure of the modification example is basically the same as the structure of the first embodiment, except that the part to be filled with the adhesive agent 81 is different. Thus, in the following, the same structural elements are given with the same references as the first embodiment and not explained. Only the part to be filled with the adhesive agent is explained.

Figure 11:
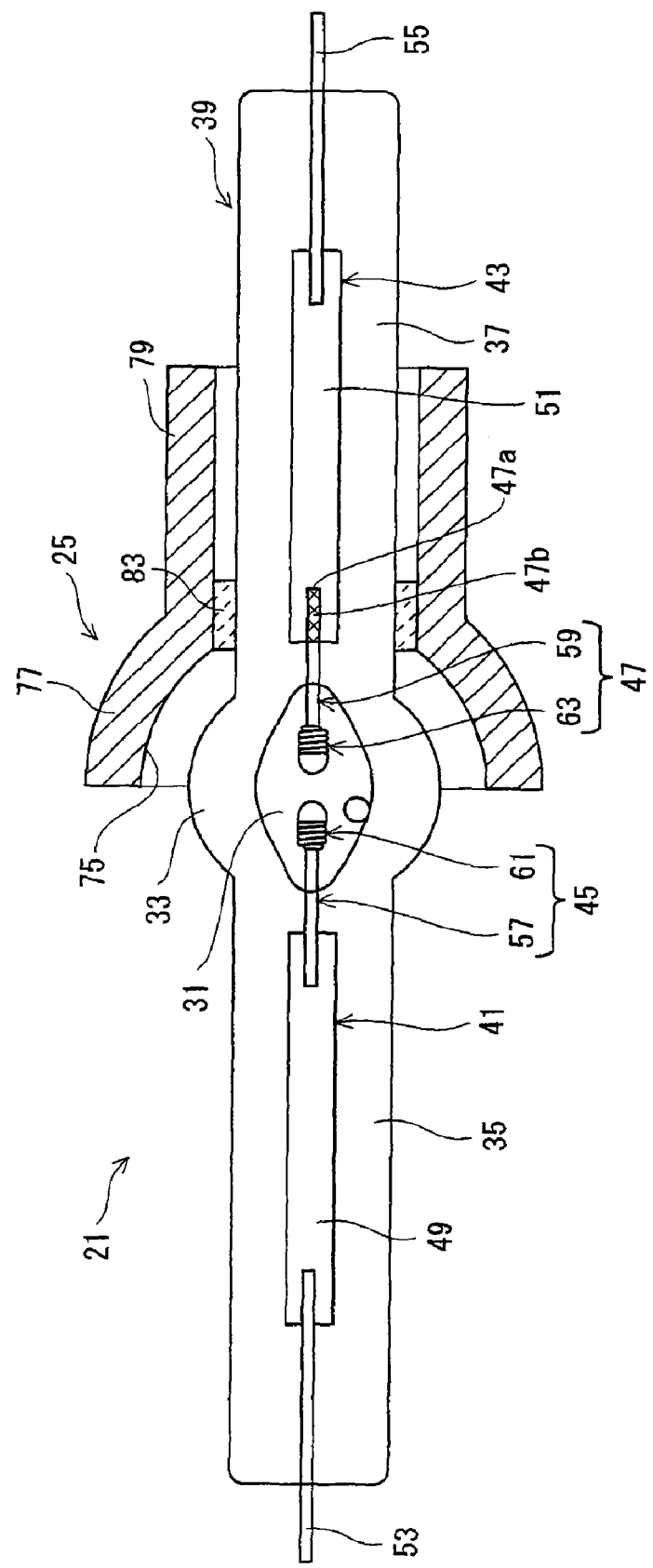
FIG. 11 shows the structures of a lamp and an auxiliary reflecting mirror pertaining to the modification example 2.

FIG. 11 shows the structures of a lamp and an auxiliary reflecting mirror pertaining to the modification example 2.

As FIG. 11 shows, an adhesive agent 83 is filled in a part of the gap between the second sealing part 37 of the lamp 21 and the cylindrical part 79 of the auxiliary reflecting mirror 25 so as to surround the whole of the joint part 47b between the second electrode 47 and the second metal foil 51.

The joint part 47b of the second electrode 47, which is the joint with the second metal foil 51, is a part that easily conducts heat to the second metal foil 51, and the temperature of the joint part 47b easily becomes relatively low. Thus, it is preferable to heat the whole joint part 47b by the adhesive agent 83, instead of heating the vicinity of the end 47a of the second electrode 47 by the adhesive agent 83. As FIG. 6 shows, if the adhesive agent 83 is filled in a part of the gap between the second sealing part 37 of the lamp 21 and the cylindrical part 79 so as to surround the whole of the joint part 47b between the second electrode 47 and the second metal foil 51, it is possible to reduce the usage amount of the adhesive agent 83 and effectively improve the luminous efficiency of the lamp 20.

Figure 12A:
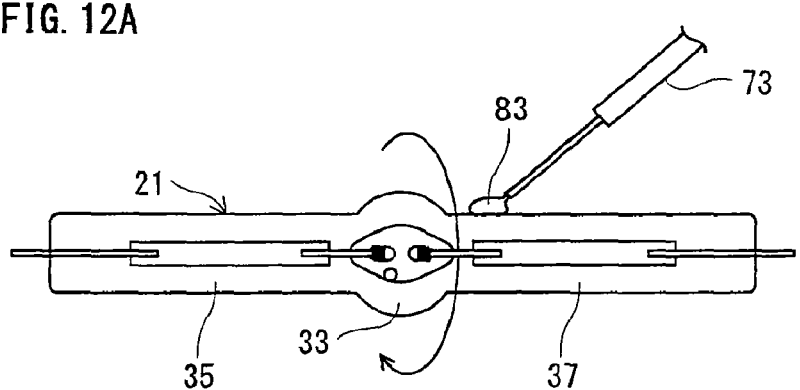
FIGS. 12A to 12C are a series of process charts showing processes for filling of an adhesive agent, pertaining to the modification example 2.
Figure 12B:
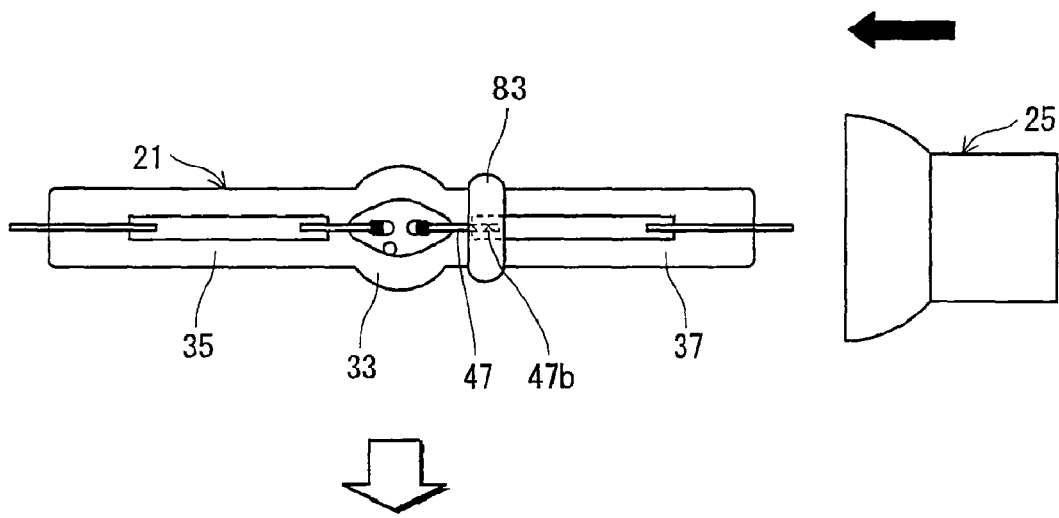
Figure 12C:
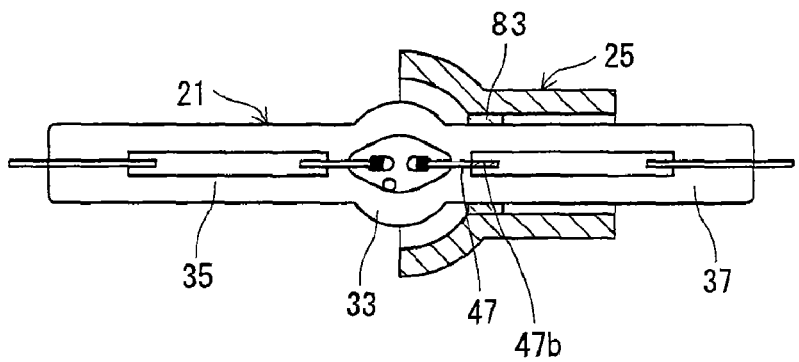

FIGS. 12A to 12C are a series of process charts showing processes for filling of an adhesive agent, pertaining to the modification example 2.

In the process for filling the adhesive agent 83 of FIGS. 12A to 12C, firstly, the part surrounding the whole of the joint part 47b between the second electrode 47 and the second metal foil 51 in the second sealing part 37 of the lamp 21 is filled with an adhesive agent 85 with a filling machine 73, as FIG. 12A. Next, as FIG. 12B shows, the second sealing part 37 is movably inserted in the reflecting mirror 25. At this moment, the end 47a of the second electrode 47 within the second sealing part 37 exists between the base end and the extended end of the cylindrical part 79. Thus, as FIG. 12C shows, the part of the gap between the second sealing part 37 and the cylindrical part 79, which surrounds the whole of the joint part 47b between the second electrode 47 and the second metal foil 51, is filled with the adhesive agent 85.

(3-2) Applicable Range of Adhesive Agent

Figure 13:
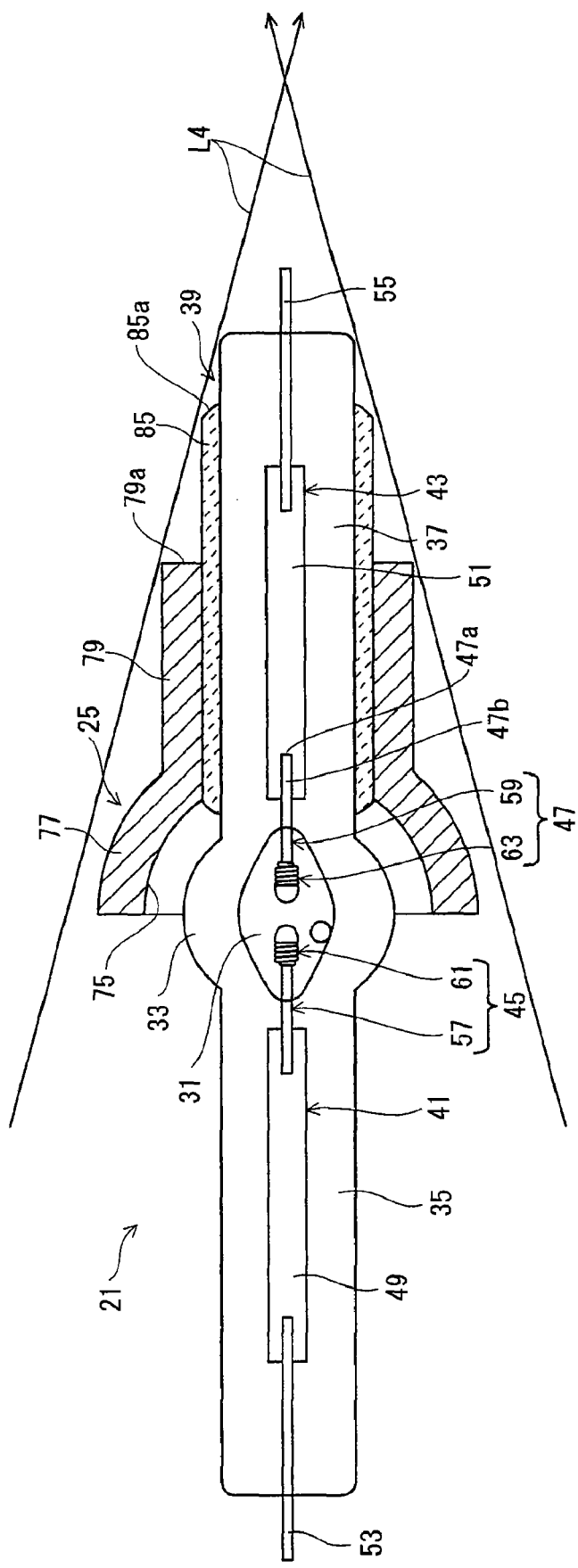
FIG. 13 shows the structures of a lamp and an auxiliary reflecting mirror pertaining to the modification example 3.

FIG. 13 shows the structures of the lamp and the auxiliary reflecting mirror pertaining to the modification example 3.

As FIG. 13 shows, in the modification example 3, the adhesive agent 85 is also filled in a part that is on the second sealing part 37 and not covered with the auxiliary reflecting mirror 25, in addition to the gap between the cylindrical part 79 of the auxiliary reflecting mirror 25 and the second sealing part 37 of the lamp 21. It is possible to further raise the coolest point temperature of the glass bulb 39 to increase the luminous efficiency of the lamp unit 20 by covering as large area as possible on the surface of the second sealing part 37 with the adhesive agent 85 as described above.

In recent years, lamp units of a type that focuses light rays to a certain single point, rather than lamp units of a type that emits parallel light rays, have become the mainstream of lamp units. Regarding the lamp units of the type that focuses light rays to a certain point, the light path length within the projector can be reduced. Thus, this type is suitable for reducing the size of the projector.

In the case of the type that focuses light rays to a certain point, if the area into which the adhesive agent is filled is too large, the adhesive agent blocks the light reflected by the reflecting surface of the main reflecting mirror, and degrades the light collection efficiency of the lamp unit. Thus, in the case of filling the adhesive agent 85 into the part not covered with the cylindrical part 79 in the structure of the modification example 2 as FIG. 13 shows, it is preferable that the adhesive agent 85 is filled in a part that does not block the light ray L3 reflected by the reflecting surface 65 of the main reflecting mirror 23.

Moreover, in the case the cylindrical part 79 of the auxiliary reflecting mirror 25 is extended to long toward the object to be irradiated, the light ray L4 reflected by the reflecting surface 65 of the main reflecting mirror 23 might be blocked. For example, depending on the position at which the auxiliary reflecting mirror 25 is attached to, the end 79a of the cylindrical part 79, on the side of the object to be irradiated, might block the light ray L4 and cause a problem that the light collection efficiency of the lamp unit 20 is degraded. Thus, it is preferable that the auxiliary reflecting mirror 25 is attached to a potion at which the cylindrical unit 79 does not block the light ray L4.

2. Projector

As a projector pertaining to the second embodiment, the front-projection type projector 140 is explained as an example. However, the projection type image display apparatus (i.e. projector) pertaining to the present invention is not limited to the front-projection type projector. For example, it may be a rear-projection type image display apparatus.

Figure 14:
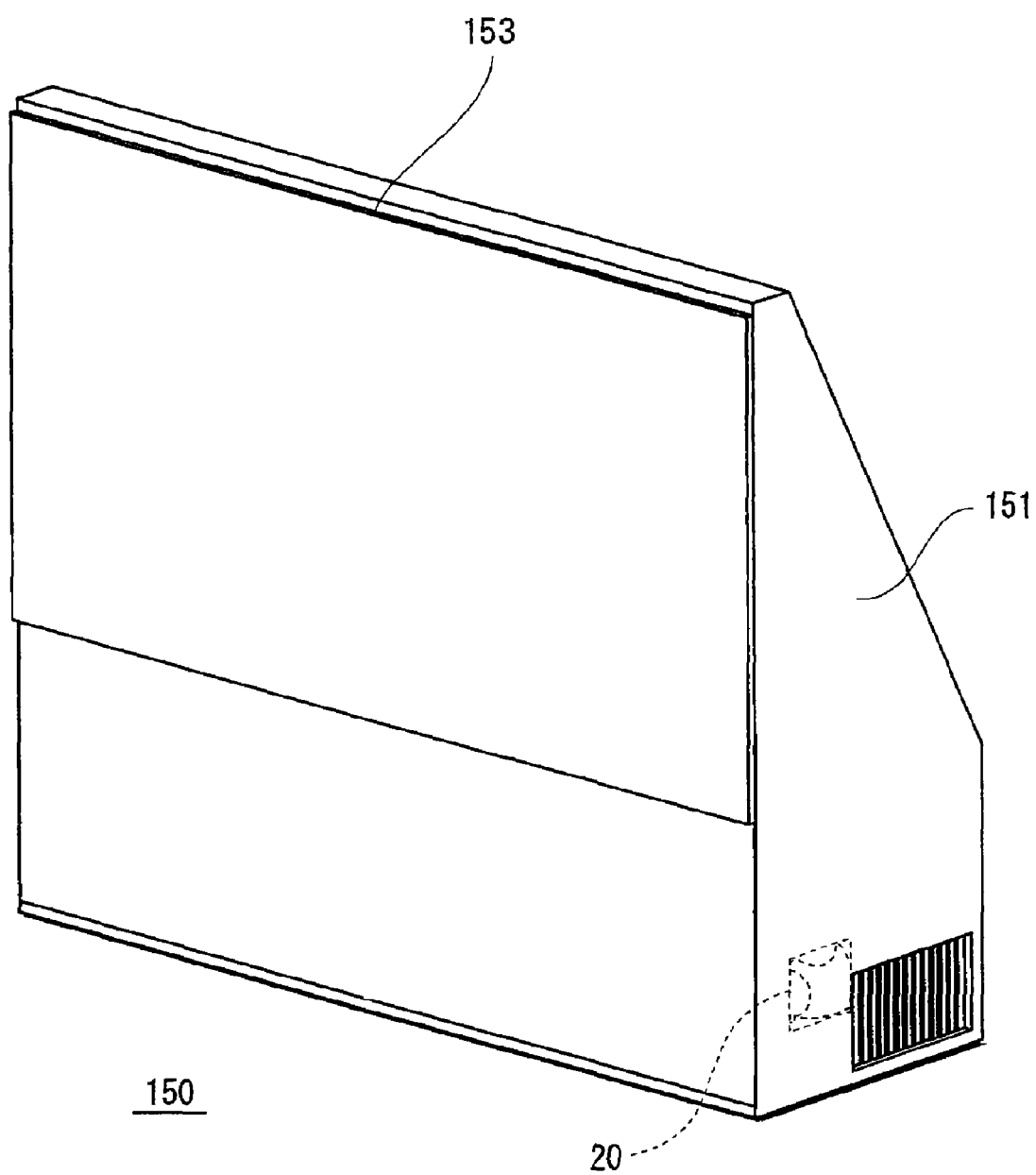
FIG. 14 is an overall perspective view of a projector pertaining to the modification example 4.
Figure 16:
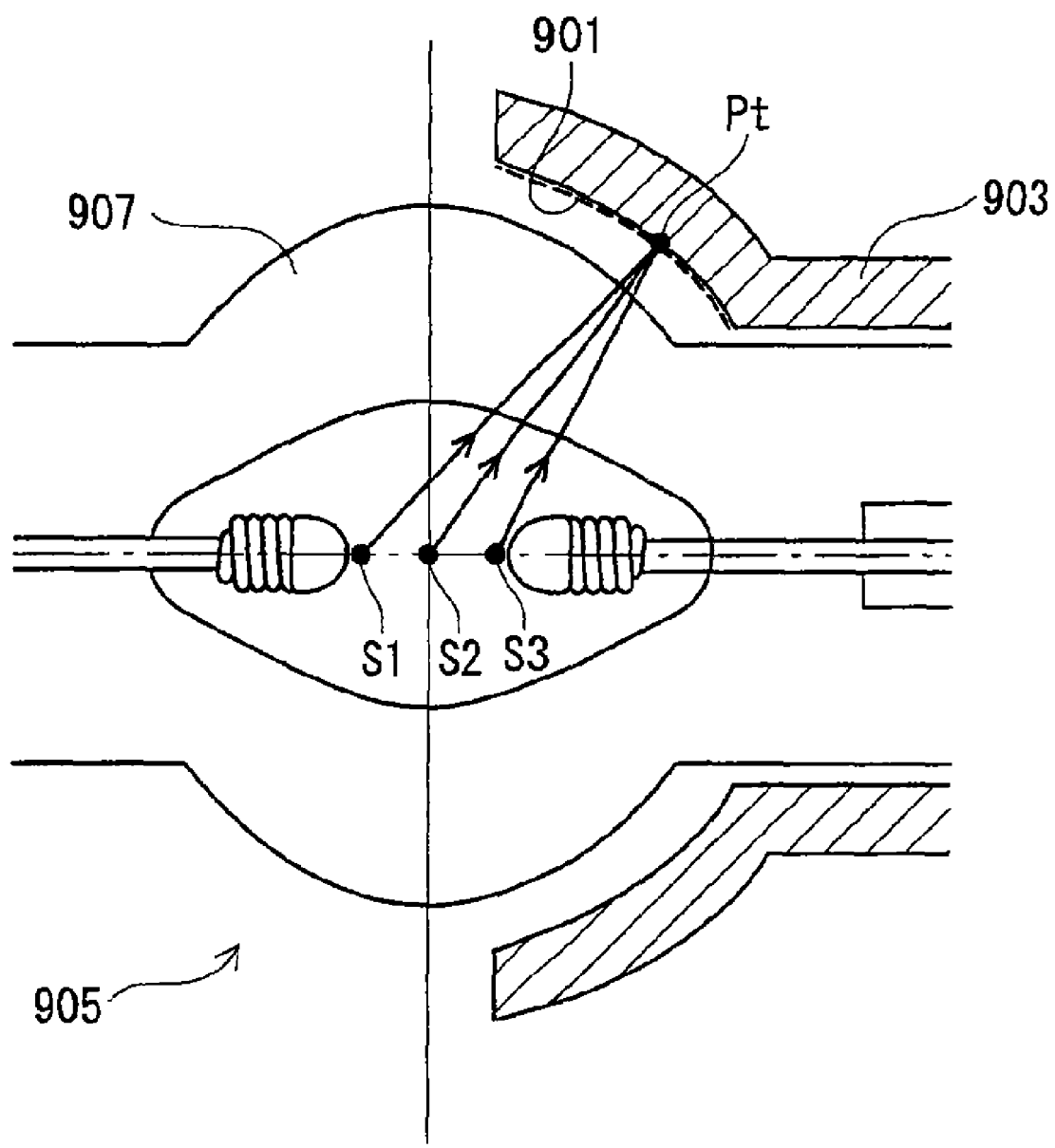
FIG. 16 shows pre-reflection paths of light rays that are emitted from points S1, S2 and S3 of FIG. 15B and reach an arbitrary point Pt on a reflecting surface.
Figure 17A:
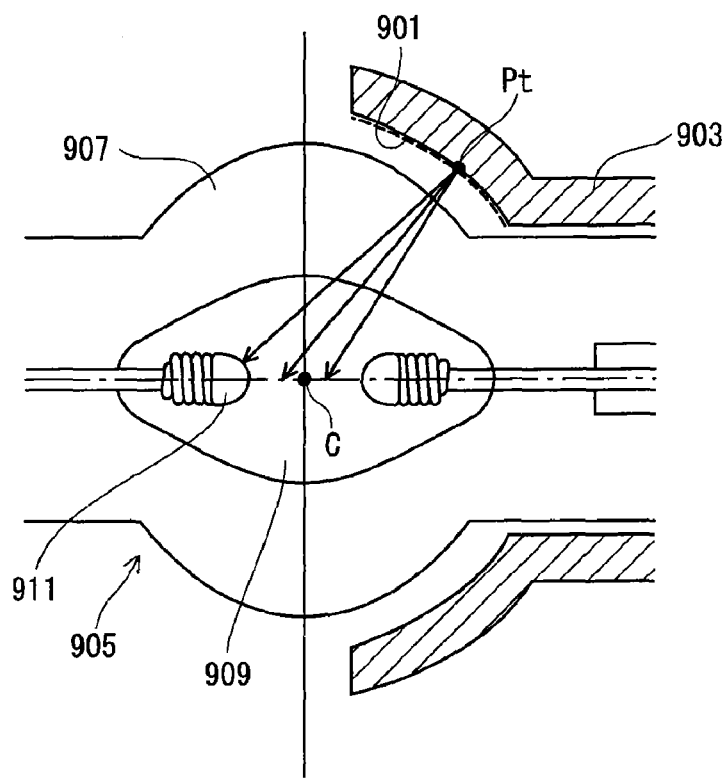
FIG. 17 shows post-reflection paths of light rays reflected at the arbitrary point Pt on the reflecting surface.
Figure 17B:
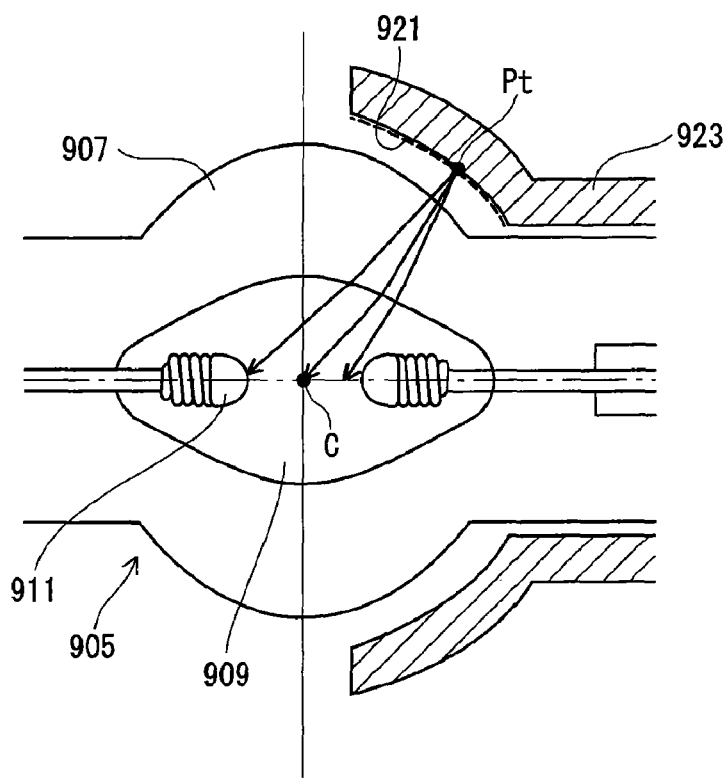

FIG. 14 is an overall perspective view of a projector pertaining to the modification example 4.

As FIG. 14 shows, the projector 150 is a so-called rear-projection type projector. The projector 150 includes a screen 153 for displaying images and so on, on the front wall of a cabinet 151. Also, the cabinet 151 houses the lamp unit 20 pertaining to the first embodiment of the present invention.

Industrial Applicability

The present invention can be used to prevent light rays emitted by a high-pressure discharge lamp from being reflected by a reflecting surface toward electrodes.

The invention claimed is:

1. A reflecting mirror that is for attaching to a high-pressure discharge lamp including a bulb and a pair of electrodes provided in the bulb, and has a reflecting surface that reflects toward the pair of electrodes some of light rays emitted by the high-pressure discharge lamp, the pair of electrodes opposing each other in a common axis thereof, wherein the reflecting surface has been corrected from a spherical surface at given reflection points on the reflecting surface such that within an area surrounded by line segments connecting points $P1(Z1, Y1)$ to $Pn(Zn, Yn)$, $Pp(Zn, 0)$, $Pq(Z1, 0)$ and the point $P1(Z1, Y1)$ in the stated order, a part corresponding to a distance between the pair of electrodes is enlarged, where (i) a Z-Y rectangular coordinate system is defined with the common axis as a Z-axis and an axis intersecting the Z-axis at a right angle as a Y-axis, (ii) a Z-coordinate of a point $Pi(Zi, Yi)(1 \leq i \leq n)$ on the Z-Y rectangular coordinate system represents a position of an intersection point with the Z-axis of an ith reflection light ray that has been emitted from an ith one of 1st to nth points $(n \geq 3)$ arranged in the common axis in number order and has been reflected at the reflection point, and a Y-coordinate of the point $P_i(Z_i, Y_i)$ represents an illuminance at the intersection point, and (iii) the point $P_p(Z_n, 0)$ and the point $P_q(Z_1, 0)$ respectively represent intersection points with the Z-axis of an nth reflection light ray and a 1st reflection light ray, wherein, a cross section of the reflecting mirror, taken along the Z-axis, has the plurality of reflection points corrected to a position offset from the spherical surface to provide the reflecting surface.

2. The reflecting minor of claim 1, wherein the $1^{st}$ to $n^{th}$ points include a center point between the pair of electrodes and a pair of points that are between the pair of electrodes and are on both sides of the center point, the pair of points showing luminance peaks.

3. The reflecting mirror of claim 1, wherein n=3, a $2^{nd}$ point arranged in the common axis is the center point between the pair of electrodes, and a $1^{st}$ point and a $3^{rd}$ point arranged in the common axis are the pair of points showing the luminance peaks.

4. The reflecting minor of claim 1, wherein the reflecting surface has been corrected at the given reflection point such that the part corresponding to the distance between the pair of electrodes is substantially maximized.

5. A lamp unit comprising a high-pressure discharge lamp and the reflecting mirror of claim 1.

6. The lamp unit of claim 5, wherein the lamp unit is attached to the high-pressure discharge lamp such that a center point on the spherical surface is identical with the center point between the pair of electrodes.

7. The lamp unit of claim 5, further comprising:

a second reflecting mirror that reflects, in a predetermined direction, light rays emitted by the high-pressure discharge lamp not toward the reflecting mirror and light rays reflected by the reflecting mirror.

8. A projection type image display apparatus comprising the lamp unit of claim 7 as a light source.

* * * * *